(12) United States Patent
Yasukawa et al.

(10) Patent No.: US 11,895,622 B2
(45) Date of Patent: Feb. 6, 2024

(54) USER APPARATUS, AND TRANSMISSION METHOD

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN); Yongbo Zeng, Beijing (CN); Yongsheng Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/935,973

(22) Filed: Jul. 22, 2020

(65) Prior Publication Data

US 2020/0351831 A1    Nov. 5, 2020

Related U.S. Application Data

(63) Continuation of application No. 15/762,373, filed as application No. PCT/JP2016/077998 on Sep. 23, 2016, now Pat. No. 10,764,865.

(30) Foreign Application Priority Data

Sep. 24, 2015   (JP) ................... 2015-187522

(51) Int. Cl.
    *H04W 72/02*    (2009.01)
    *H04W 92/18*    (2009.01)
    (Continued)

(52) U.S. Cl.
    CPC ............ *H04W 72/02* (2013.01); *H04J 13/18* (2013.01); *H04L 5/0044* (2013.01);
    (Continued)

(58) Field of Classification Search
    None
    See application file for complete search history.

(56) References Cited

U.S. PATENT DOCUMENTS

10,764,865 B2 * 9/2020 Yasukawa ............ H04L 5/0044
2013/0051406 A1   2/2013 Bugge et al.
(Continued)

FOREIGN PATENT DOCUMENTS

CN   104640211 A    5/2015
EP   3107230 A1   12/2016
(Continued)

OTHER PUBLICATIONS

International Search Report of the International Searching Authority issued in PCT/JP2016/077998 dated Dec. 13, 2016 (5 pages).
(Continued)

*Primary Examiner* — Anh Vu H Ly
(74) *Attorney, Agent, or Firm* — Osha Bergman Watanabe & Burton LLP

(57) ABSTRACT

A user apparatus in a mobile communication system includes an allocation means that divides a message that includes control information and data into a plurality of partial messages, and allocates resources included in one or more resource pools to the plurality of partial messages; and a transmission means that transmits the plurality of partial messages using the resources allocated by the allocation means.

3 Claims, 30 Drawing Sheets

(51) Int. Cl.
  *H04J 13/18* (2011.01)
  *H04L 5/00* (2006.01)
  *H04W 72/21* (2023.01)

(52) U.S. Cl.
  CPC .......... *H04L 5/0051* (2013.01); *H04L 5/0053* (2013.01); *H04L 5/0094* (2013.01); *H04W 72/21* (2023.01); *H04W 92/18* (2013.01)

(56) References Cited

U.S. PATENT DOCUMENTS

| | | |
|---|---|---|
| 2014/0328329 A1 | 11/2014 | Novlan et al. |
| 2015/0110060 A1 | 4/2015 | Yan et al. |
| 2015/0264588 A1 | 9/2015 | Li et al. |
| 2015/0282158 A1* | 10/2015 | Chen ................ H04L 5/0053 370/329 |
| 2016/0286560 A1 | 9/2016 | Gao et al. |
| 2016/0353478 A1* | 12/2016 | Kim ................ H04W 72/12 |
| 2017/0013638 A1 | 1/2017 | Takahashi et al. |
| 2017/0034687 A1 | 2/2017 | Yu et al. |
| 2017/0086168 A1 | 3/2017 | Takahashi et al. |
| 2017/0230957 A1 | 8/2017 | Wakabayashi et al. |
| 2017/0295554 A1 | 10/2017 | Lee et al. |
| 2018/0035477 A1* | 2/2018 | Van Phan ............ H04L 67/146 |
| 2018/0076994 A1* | 3/2018 | Lee ................ H04L 1/00 |
| 2018/0132254 A1 | 5/2018 | Chae et al. |
| 2018/0176891 A1* | 6/2018 | Kim ................ H04W 24/08 |
| 2018/0213549 A1 | 7/2018 | Kim et al. |
| 2018/0255444 A1 | 9/2018 | Chae et al. |
| 2019/0089564 A1* | 3/2019 | Blasco Serrano .... H04L 5/0044 |

FOREIGN PATENT DOCUMENTS

| | | |
|---|---|---|
| EP | 3110222 A1 | 12/2016 |
| WO | 2015122715 A1 | 8/2015 |
| WO | 2015126114 A1 | 8/2015 |
| WO | 2015/137781 A1 | 9/2015 |

OTHER PUBLICATIONS

Written Opinion of the International Searching Authority issued in PCT/JP2016/077998 dated Dec. 13, 2016 (4 pages).
Potevio; "Resource allocation Mode 2 for D2D communication"; 3GPP TSG RAN WG1 Meeting #77, R1-142512; Seoul, Korea; May 19-23, 2014 (3 pages).
Ericsson; "D2D communication addressing", 3GPP TSG-RAN WG2 #85, Tdoc R2-140623; Prague, Czech Republic; Feb. 10-14, 2014 (6 pages).
Bertenyi, B.; "Key drivers for LTE success: Services Evolution"; 3GPP Seminar, LTE Asia; Sep. 6, 2011 (15 pages).
3GPP TS 36.213 V12.4.0; "3rd Generation Partnership Project; Technical Specification Group Radio Access Network; Evolved Universal Terrestrial Radio Access (E-UTRA); Physical layer procedures (Release 12)"; Dec. 2014 (225 pages).
Extended European Search Report issued in the counterpart European Patent Application No. 16848651.2, dated Sep. 4, 2018 (11 pages).
LG Electronics; "Potential enhancements for PC5-based V2V"; 3GPP TSG RAN WG1 Meeting #82 R1-154290; Beijing, China, Aug. 24-28, 2015 (4 pages).
Office Action in corresponding Japanese Application No. 2017-541585 dated Oct. 9, 2018 (6 pages).
Office Action issued in counterpart European Patent Application No. 16848651.2, dated Jul. 30, 2019 (6 Pages).
Office Action issued in counterpart European Patent Application No. 16848651.2, dated Mar. 16, 2020 (5 pages).
Office Action issued in counterpart European Patent Application No. 16848651.2, dated Nov. 2, 2020 (8 pages).
Summons to Attend Oral Proceedings issued in counterpart European Application No. 16848651.2 dated Sep. 24, 2021 (9 pages).
Fujitsu; "Further analysis on control signal and Scheduling Assignment for D2D communication"; 3GPP TSG-RAN1 #76bis, R1-141229; Shenzhen, China, Mar. 31-Apr. 4, 2014 (7 pages).
ZTE; "Control Channel Design for D2D link"; 3GPP TSG-RAN WG1 Meeting #75, R1-135369; San Francisco, USA Nov. 11-15, 2013 (5 pages).
Office Action issued in Chinese Application No. 201680055436.8; dated Jun. 22, 2021 (12 pages).
Office Action issued in the counterpart European Patent Application No. 16848651.2, dated May 27, 2022 (12 pages).
Extended European Search Report in counterpart European Application No. 22 16 2659.1 dated Jun. 15, 2022 (11 pages).
Office Action issued in corresponding Chinese Application No. 202111291533.6, dated May 26, 2023 (16 pages).
Office Action issued in the counterpart Chinese Patent Application No. 202111291533.6 dated Nov. 20, 2023 (16 pages).

* cited by examiner

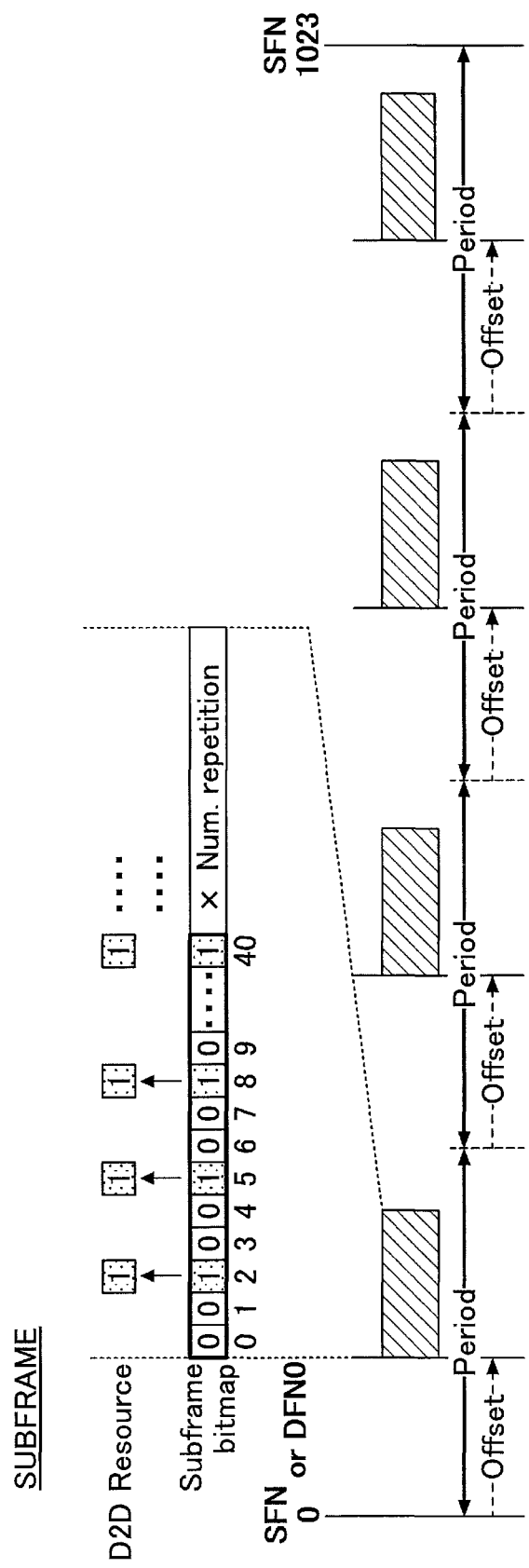

RESOURCE BLOCKS

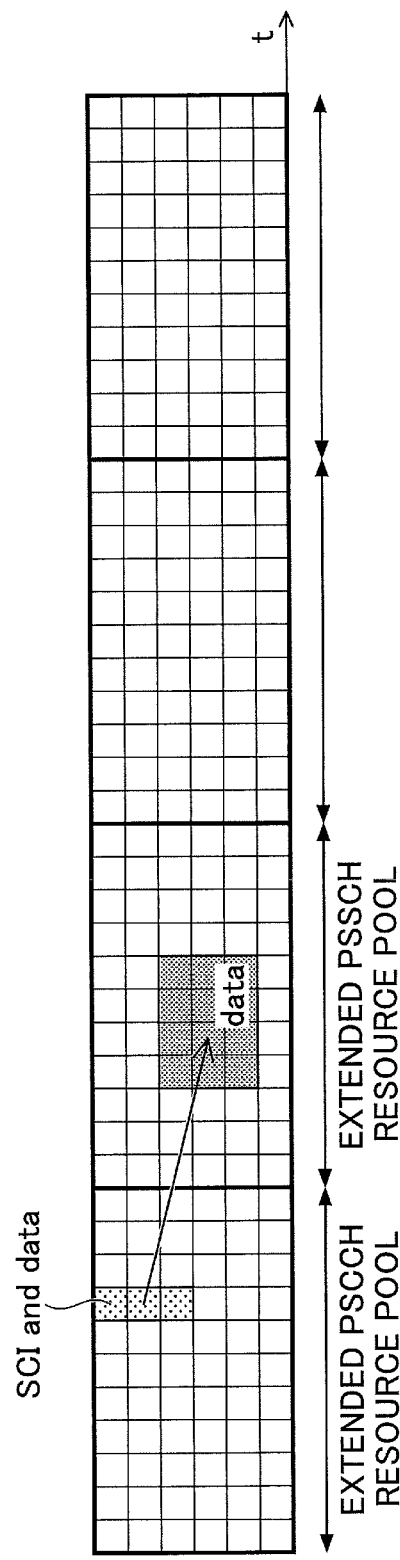

FIG.15A

| MESSAGE SIZE | | BASE SEQUENCE | CYCLIC SHIFT |
|---|---|---|---|
| MESSAGE A | 3 PARTS (SUB-MESSAGES) | X | {0,1,2} REPRESENT PART INDEXES {1,2,3} |
| MESSAGE B | 2 PARTS (SUB-MESSAGES) | Y | {0,1} REPRESENT PART INDEXES {1,2} |

FIG.15B

| MESSAGE SIZE | | OCC SET | CYCLIC SHIFT |
|---|---|---|---|
| MESSAGE A | 3 PARTS (SUB-MESSAGES) | {1,-1} | {0,1,2} REPRESENT PART INDEXES {1,2,3} |
| MESSAGE B | 2 PARTS (SUB-MESSAGES) | {1,1} | {0,1} REPRESENT PART INDEXES {1,2} |

FIG.16B

| MESSAGE SIZE | | BASE SEQUENCE | CYCLIC SHIFT |
|---|---|---|---|
| MESSAGE A | FIXED SIZE: N<br>VARIABLE SIZE: M1 | × | 0: MCS-a FOR FIXED-SIZE PART<br>1: MCS-b FOR VARIABLE-SIZE PART |
| MESSAGE B | FIXED SIZE: N<br>VARIABLE SIZE: M2 | × | 0: MCS-a FOR FIXED-SIZE PART<br>2: MCS-c FOR VARIABLE-SIZE PART |

USER APPARATUS, AND TRANSMISSION METHOD

CROSS-REFERENCE TO RELATED APPLICATIONS

This application is a continuation application of U.S. patent application Ser. No. 15/762,373, filed on Mar. 22, 2018, which is a national phase application of PCT/JP2016/077998, filed on Sep. 23, 2016, which claims priority to Japanese Patent Application No. 2015-187522, filed on Sep. 24, 2015. The contents of these applications are hereby incorporated by reference in their entirety.

TECHNICAL FIELD

The present invention relates to a D2D signal transmission and reception technology in a mobile communication system that supports D2D.

BACKGROUND ART

In LTE (Long Term Evolution) and successor systems of LTE (for example, LTE-A (LTE Advanced), FRA (Future Radio Access), also called 4G or the like), a D2D (Device to Device) technology for user apparatuses (UEs) to carry out communication together directly without using a radio base station (eNB) has been studied (for example, Non-patent Reference No. 1).

D2D enables reduction of traffic between a UE and a eNB, and enables communication between UEs even if a eNB is in a communication impossible state due to a disaster or the like.

D2D is classified roughly into D2D discovery and D2D communication (D2D direct communication). Below, D2D communication and D2D discovery will be simply referred to as D2D if D2D communication and D2D discovery are not particularly distinguished. Also, a signal transmitted and received by D2D will be referred to as a D2D signal.

Also, in 3GPP (3rd Generation Partnership Project), it has been studied to implement V2X by extending the D2D function. As shown in FIG. 1, V2X includes a V2V (Vehicle to Vehicle) meaning a communication mode between an automobile (one example of a vehicle) and an automobile; V2I (Vehicle to Infrastructure) meaning a communication mode between an automobile and a road-side unit (RSU) installed at a road side; V2N (Vehicle to Nomadic device) meaning a communication mode between an automobile and a mobile terminal of a driver; and V2P (Vehicle to Pedestrian) meaning a communication mode between an automobile and a mobile terminal of a pedestrian.

PRIOR ART REFERENCE

Non-Patent Reference

Non-patent Reference No. 1: "Key drivers for LTE success: Services Evolution", September 2011, 3GPP, Internet URL: www.3gpp.org
Non-patent Reference No. 1: 3GPP T536.213 V12.4.0 (2014-12)

SUMMARY OF THE INVENTION

Problem to be Solved by the Invention

The V2X technology is based on the D2D technology prescribed in LTE. In the D2D technology, concerning the above-described "communication", a method of allocating a resource pool to control information and a resource pool to data separately is adopted. However, concerning "communication", in V2X assuming high-speed movement such as an automobile, overhead may increase in the above-mentioned method of allocating a resource pool to control information and a resource pool to data separately. Consequently, a delay may increase, and so forth, whereby it may be impossible to satisfy the required conditions of V2X, and it may be impossible to appropriately transmit and receive data.

Note that, considering that V2X is one type of D2D, the above-mentioned problem may occur not only in V2X but also in the whole extent of D2D.

The present invention has been devised in consideration of the above-mentioned point, and an object is to provide a D2D communication technology with which, in a mobile communication system supporting D2D, it is possible to reduce overhead, and transmit and receive data appropriately.

Means to Solve the Problem

According to an embodiment of the present invention, a user apparatus in a mobile communication system is provided. The user apparatus includes
  an allocation means that divides a message that includes control information and data into a plurality of partial messages, and allocates resources included in one or more resource pools to the plurality of partial messages; and
  a transmission means that transmits the plurality of partial messages using the resources allocated by the allocation means.

Also, according to an embodiment of the present invention, a transmission method carried out by a user apparatus in a mobile communication system is provided. The transmission method includes
  an allocation step of dividing a message that includes control information and data into a plurality of partial messages, and allocating resources included in one or more resource pools to the plurality of partial messages; and
  a transmission step of transmitting the plurality of partial messages using the resources allocated in the allocation step.

Advantageous Effects of the Invention

According to the embodiments of the present invention, it is possible to provide a D2D communication technology with which, in a mobile communication system supporting D2D, it is possible to reduce overhead, and transmit and receive data appropriately.

BRIEF DESCRIPTION OF THE DRAWINGS

FIG. 8A shows a resource pool configuration.

FIG. 10B illustrates an outline of the embodiments.

FIG. 15A shows an example of relationships between a message structure and DMRS information.

FIG. 15B shows an example of relationships between a message structure and DMRS information.

FIG. 16B illustrates another example where control using a DMRS is carried out in Example 1-2.

MODES FOR CARRYING OUT THE INVENTION

Below, embodiments of the present invention will be described with reference to the drawings. Note that, the embodiments that will now be described are merely examples, and embodiments to which the present invention is applied are not limited to the embodiments that will now be described. For example, mobile communication systems according to the embodiments are assumed as being compatible with LTE. However, the present invention is not limited to LTE, and may be applied to another radio system. Note that, in the specification and the claims, "LTE" is used to have wide meaning converting communication systems compatible with 3GPP Rel-12 and 13, and further later releases (including 5G).

Also, the embodiments are mainly intended for V2X. However, technologies concerning the embodiments are not limited to V2X, and can be widely applied to the whole extent of D2D. "D2D" covers V2X in its meaning.

Below, basically, a base station will be referred to as a "eNB", and a user apparatus will be referred to as a "UE". A eNB is an abbreviation of "evolved Node B", and a UE is an abbreviation of a "User Equipment".

(Outline of D2D)

A technology of V2X concerning the embodiments is based on D2D prescribed in LTE. Therefore, first, an outline of D2D prescribed in LTE will be described. Note that, also in V2X, a technology of D2D that will now be described may be used, and a UE in the embodiments of the present invention can transmit and receive D2D signals according to the technology.

Figure 1:
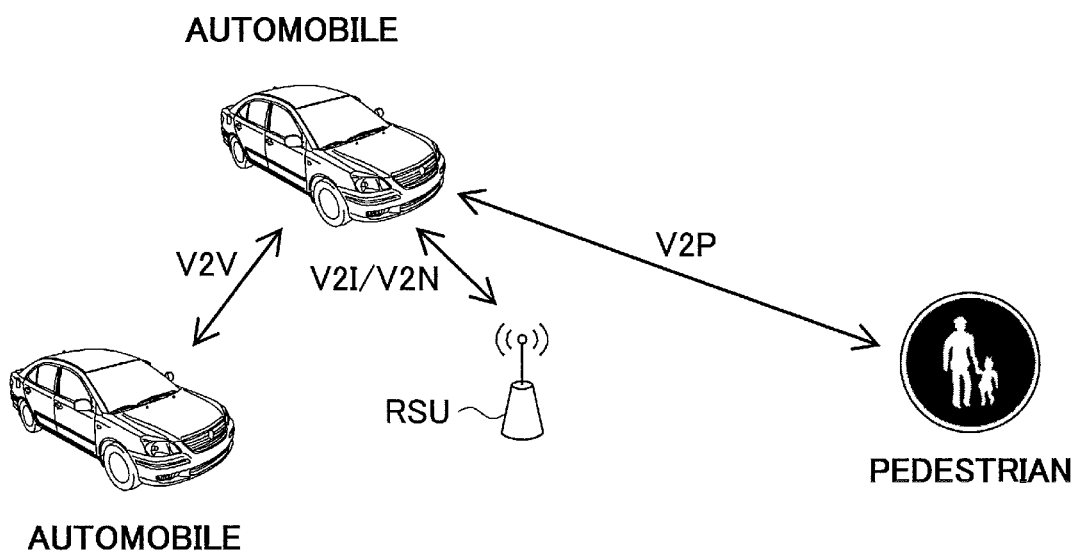
FIG. 1 illustrates V2X.
Figure 2A:
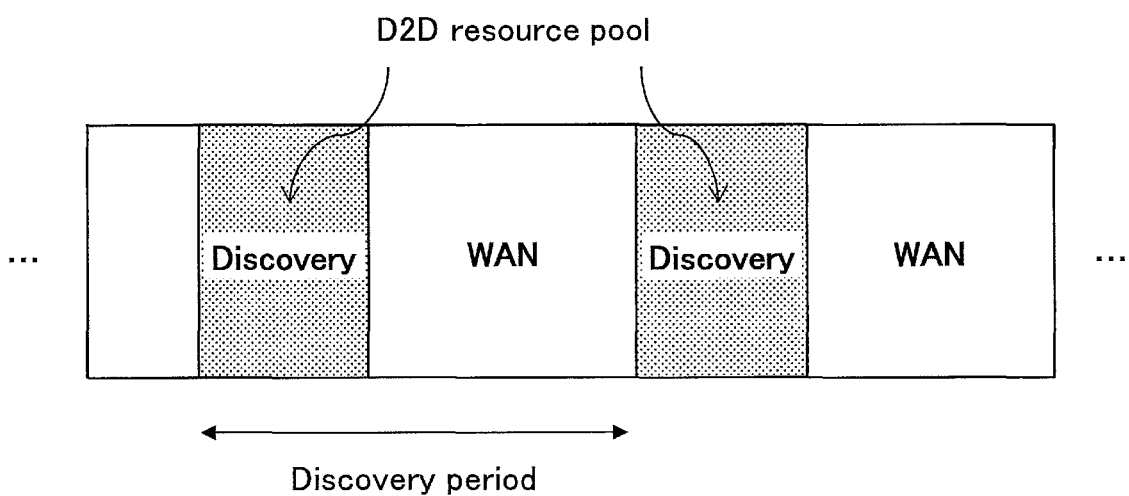
FIG. 2A illustrates D2D.

As described above, D2D is classified roughly into "Discovery" and "Communication". Concerning "Discovery", as shown in FIG. 2A, a resource pool for a Discovery message is secured for each Discovery period, and a UE transmits the Discovery message in the resource pool. In more detail, there are Type1 and Type2b. According to Type1, a UE autonomously selects a transmission resource from the resource pool. According to Type2b, semi-static resources are allocated through upper layer signaling (for example, an RRC signal).

Figure 2B:
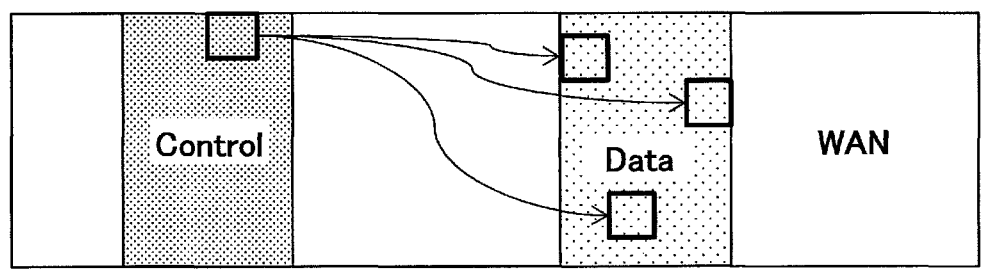
FIG. 2B illustrates D2D.

Also concerning "Communication", as shown in FIG. 2B, a resource pool for Control/Data transmission is periodically secured. This period is called a SC period (sidelink control period). A transmission-side UE reports data transmission resources, and so forth, to a reception side through resources selected from a Control resource pool (SCI resource pool) using SCI (Sidelink Control Information), and transmits data through the data transmission resources. In more detail, concerning "Communication", there are Mode1 and Mode2. According to Model, resources are allocated dynamically through (E)PDCCH sent from a eNB to a UE. According to Mode2, a UE autonomously selects transmission resources from a resource pool. Concerning a resource pool, a resource pool reported using SIB or a resource pool previously defined is used.

According to LTE, a channel used for "Discovery" is called PSDCH (Physical Sidelink Discovery Channel). A channel for transmitting control information such as SCI in "Communication" is called PSCCH (Physical Sidelink Control Channel). A channel for transmitting data is called PSSCH (Physical Sidelink Shared Channel) (Non-patent Reference No. 2).

Figure 3:
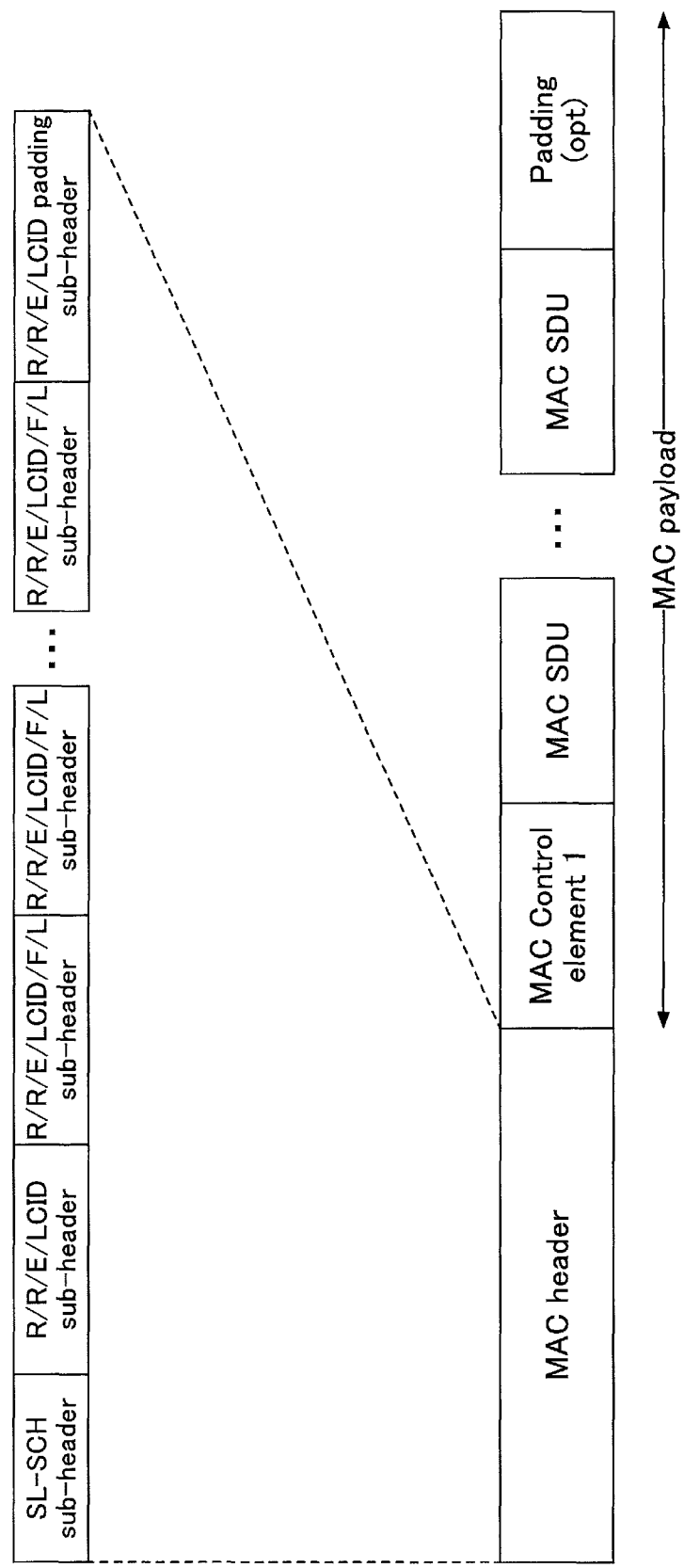
FIG. 3 illustrates MAC PDU used in D2D communication.

A MAC (Medium Access Control) PDU (Protocol Data Unit) used in D2D communication includes, as shown in FIG. 3, at least a MAC header, a MAC Control element, a MAC SDU (Service Data Unit), and Padding. The MAC PDU may include other information. The MAC header includes a single SL-SCH (Sidelink Shared Channel) sub-header, and one or more MAC PDU subheaders.

Figure 4:
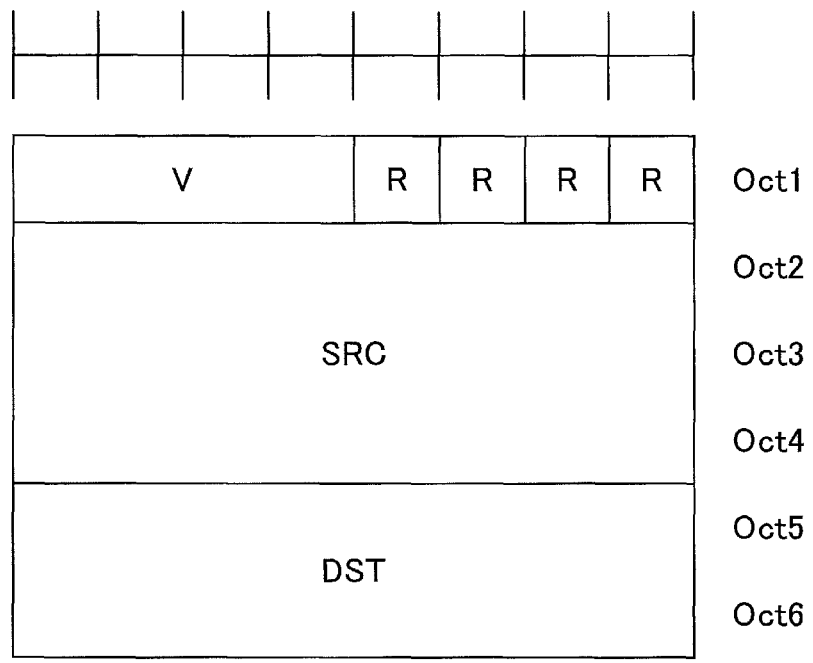
FIG. 4 illustrates a format of SL-SCH subheader.

As shown in FIG. 4, the SL-SCH subheader includes a MAC PDU format version (V), transmission-source information (SRC), transmission-destination information (DST), and Reserved bits (R). V is allocated at the top of the SL-SCH subheader, and indicates a MAC PDU format version that a UE uses. In the transmission-source information, information concerning the transmission source is set. In the transmission-source information, an identifier concerning ProSe UE ID may be set. In the transmission-destination information, information concerning the transmission destination is set. In the transmission-destination information, information concerning ProSe Layer-2 Group ID of the transmission destination may be set.

Figure 5:
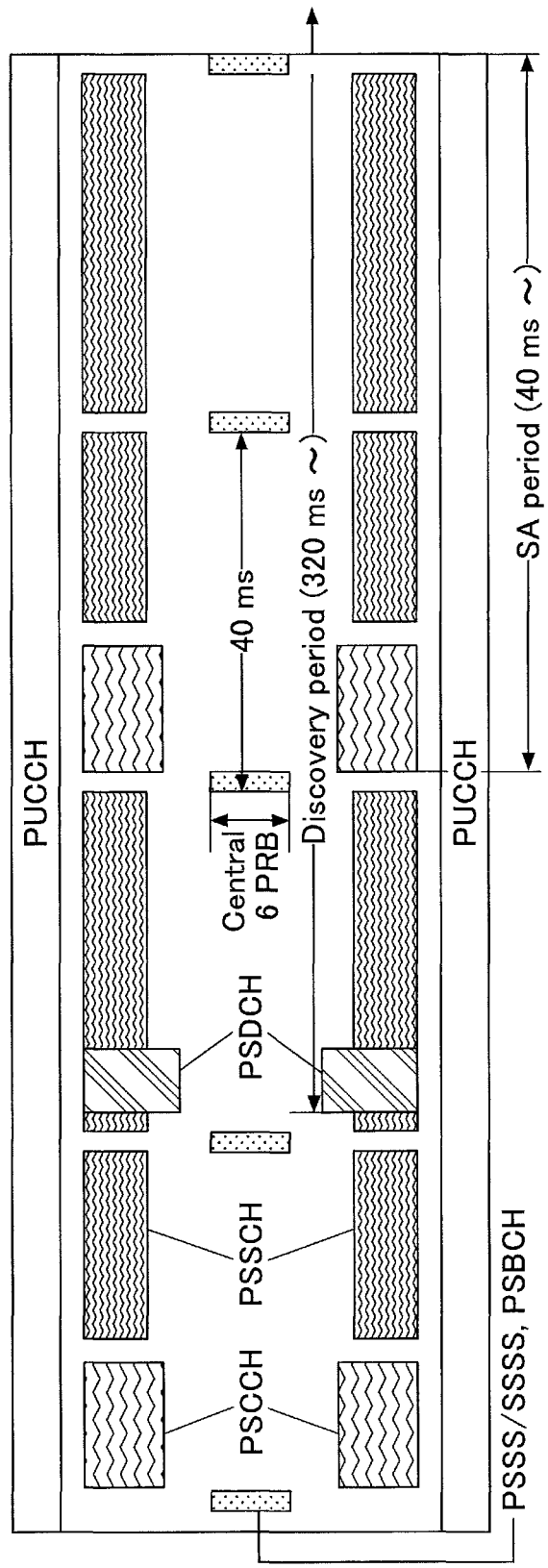
FIG. 5 illustrates an example of a channel structure used in D2D.

FIG. 5 shows an example of a D2D channel structure. As shown in FIG. 5, a PSCCH resource pool and a PSSCH resource pool to be used for Communication are allocated. Also, a PSDCH resource pool used for Discovery in a period longer than the period of the channel of Communication is allocated.

Also, as synchronization signals for D2D, a PSSS (Primary Sidelink Synchronization signal), and a SSSS (Secondary Sidelink Synchronization signal) are used. Also, a PSBCH (Physical Sidelink Broadcast Channel) for transmitting broadcast information such as a D2D system band, a frame number, resource configuration information, and so forth, for outside-coverage operation, for example, is used.

Figure 6A:
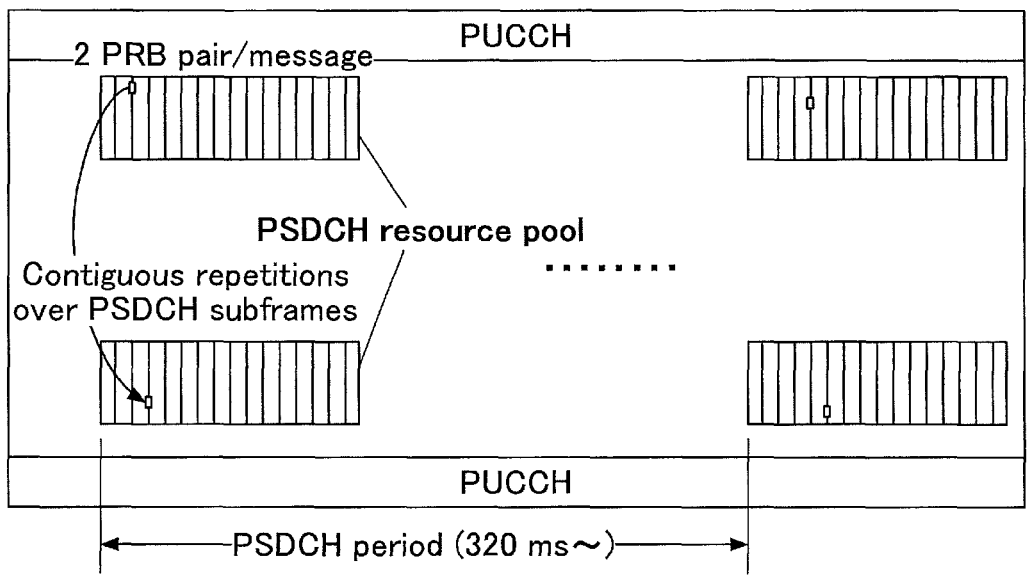
FIG. 6A shows an example of a PSDCH structure.
Figure 6B:
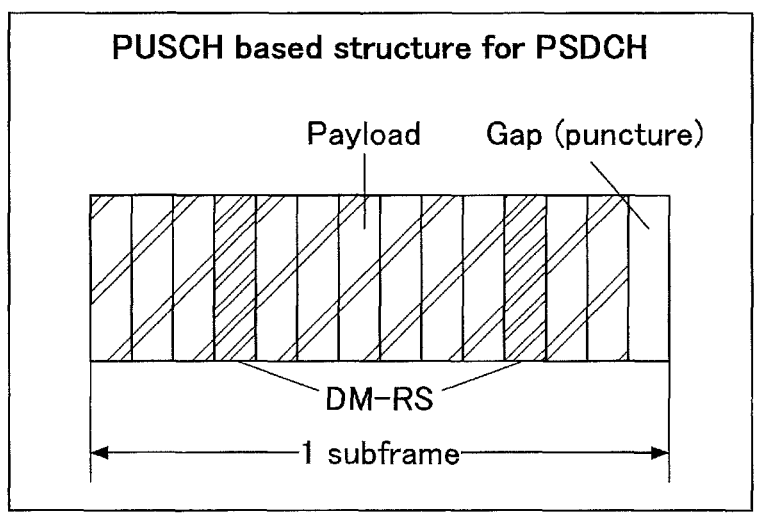
FIG. 6B shows one example of a PSDCH structure.

FIG. 6A shows an example of the PSDCH resource pool used for Discovery. Because configuration of the resource pool is made using a bitmap of subframes, the resource pool can be expressed as an image of FIG. 6A. The resource pools of the other channels have configurations similar thereto. PSDCH is transmitted repetitiously (repetitions) while frequency hopping is carried out. The number of repetitions can be determined within a range of 0 to 4, for example. As shown in FIG. 6B, PSDCH has a PUSCH based structure, and has such a structure that a DMRS (demodulation reference signal) is inserted.

Figure 7A:
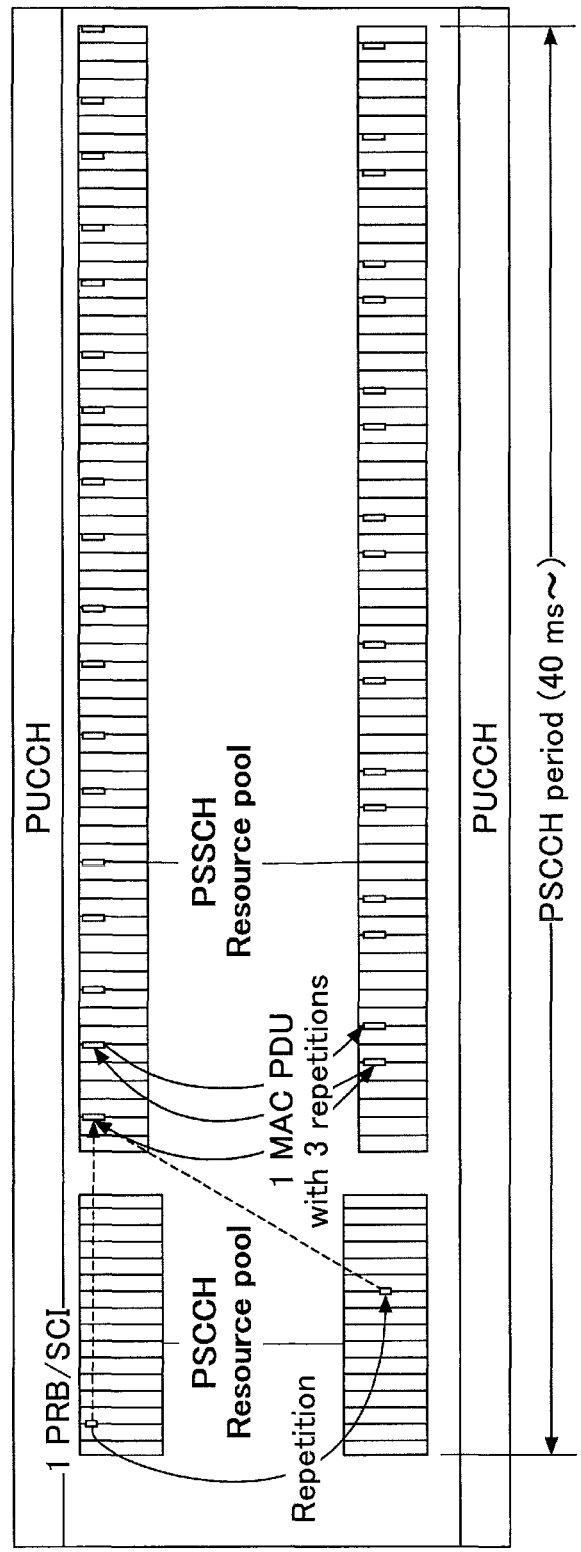
FIG. 7A shows examples of PSCCH and PSSCH structures.
Figure 7B:
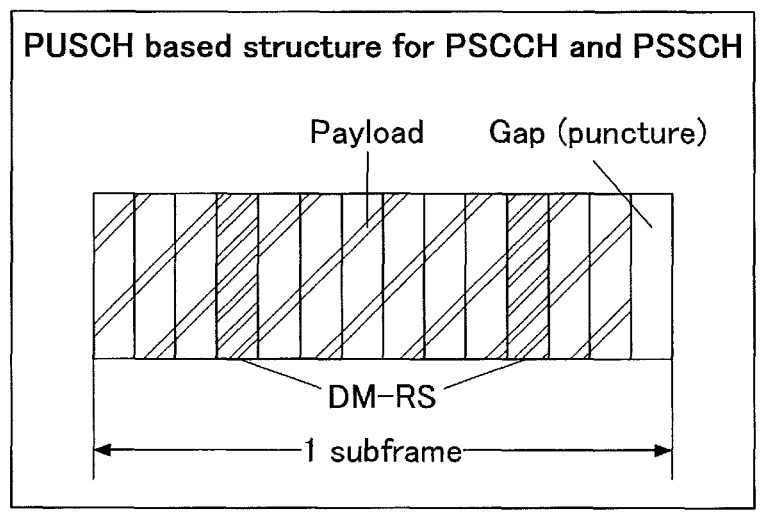
FIG. 7B shows examples of PSCCH and PSSCH structures.

FIG. 7A shows an example of the PSCCH and PSSCH resource pools used for "Communication". As shown in FIG. 7A, PSCCH is transmitted repetitiously once (repetition) while frequency hopping is carried out. PSSCH is transmitted repetitiously thrice (repetitions) while frequency hopping is carried out. As shown in FIG. 7B, PSCCH and PSSCH have PUSCH based structures, and have such structures that DMRSs are inserted.

Figure 8B:
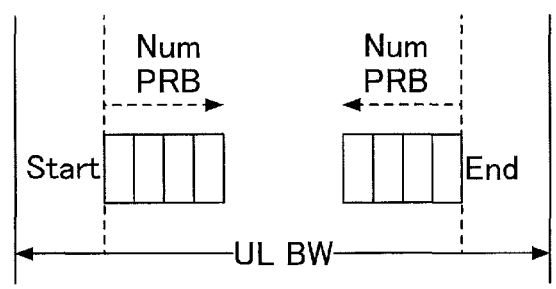
FIG. 8B shows a resource pool configuration.

FIGS. 8A and 8B show examples of resource pool configurations in PSCCH, PSDCH, and PSSCH (Model). As shown in FIG. 8A, in time direction, the resource pool is expressed as a subframe bitmap. The bitmap is repeated the number of times of "num.reprtition". The "offset" indicating the start position in each period is designated.

In frequency direction, contiguous allocation and non-contiguous allocation are available. FIG. 8B shows an example of non-contiguous allocation. As shown, the start PRB, the end PRB, and the number of PRBs (numPRB) are designated.

(System Configuration)

Figure 9:
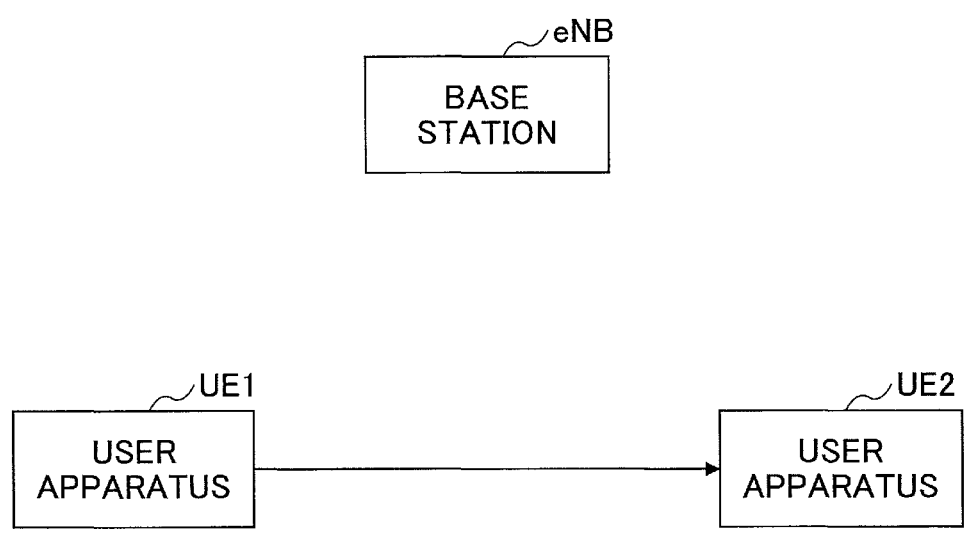
FIG. 9 is a configuration diagram of a communication system according to an embodiment of the present invention.

FIG. 9 shows one example of a communication system according to the embodiments. As shown in FIG. 9, a eNB, a UE1, and a UE2 are included. In FIG. 9, the UE1 is indicated as a transmission side and the UE2 is indicated as a reception side. However, each of the UE1 and the UE2 has both a transmission function and a reception function. Hereinafter, the UE1 and the UE2 will be merely referred to as UEs when the UE1 and the UE2 are not particularly distinguished. Note that, the eNB carries out, for example, configuration of a resource pool for each UE, reporting various sorts of configuration information, and so forth. However, communication of data and so forth according to the embodiments between the UEs is carried out without using the eNB.

Each of the UE1 and the UE2 shown in FIG. 9 has a cellular communication function as a UE according to LTE, and a D2D function including signal transmission and reception using the above-described channels. Also, the UE1 and the UE2 have functions of carrying out operations that will be described concerning the embodiments. Note that, concerning the cellular communication function and the conventional D2D function, the UE1 and the UE2 may have the functions only partially (within such a range that the operations of the embodiments can be carried out), or may have the functions completely.

Also, each UE may be any apparatus that carries out V2X. For example, each UE is a terminal, a RSU, or the like, held by a vehicle or a pedestrian.

The eNB also has a cellular communication function as an eNB according to LTE, and functions enabling communication of the UEs according to the embodiments (a resource pool allocation function, a configuration information reporting function, and so forth).

Outline of Embodiments

Next, an outline of resource allocation when the UE carries out data transmission in the embodiments (first and second embodiments) of the present invention will be described.

Figure 10A:
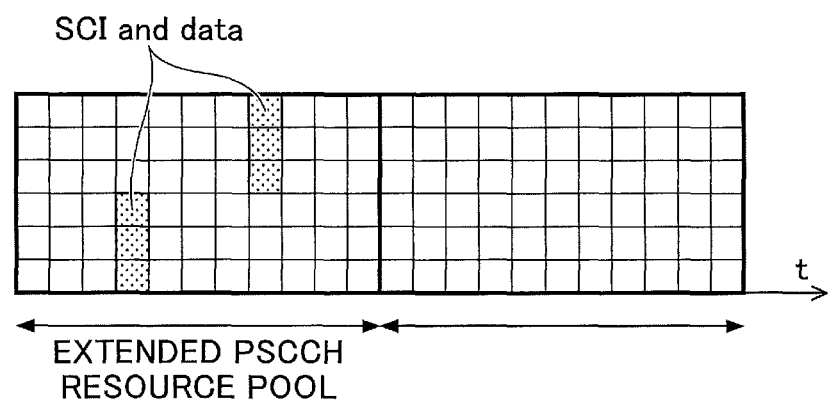
FIG. 10A illustrates an outline of the embodiments.

FIG. 10A shows an example of resource allocation according to the first embodiment. According to the first embodiment, the UE multiplexes control information and data in resources within a single resource pool, and transmits the control information and data using the resources. In FIG. 10A, as one example, an extended PSCCH resource pool having a similar structure to the structure of the PSCCH resource pool is shown as a resource pool of resources in which control information and data are multiplexed. Alternatively, the resource pool may be an extended PSSCH resource pool having a similar structure to the structure of the PSSCH resource pool.

As will be described later, according to the first embodiment, there are a method of transmitting multiplexed control information and data using a single cluster, and a method of transmitting control information and/or data using a plurality of clusters. Multiplexing control information and data may be multiplexing in PRB (Physical Resource Block) units or in RE (Resource Element) units.

According to the second embodiment, as shown in FIG. 10B, a resource pool of resources for multiplexing and transmitting control information and data and a resource pool of resources for transmitting data are partitioned. This method is advantageous for a case of transmitting a message (that may be called a packet) having a size larger than a size of a message in the first embodiment.

The UE according to the embodiments has both the functions for the method concerning the first embodiment and the method concerning the second embodiment. Configuration information from the eNB is used to determine which of these methods is used to transmit a message. However, this is one example, and the UE may be compatible with only either one of the respective methods concerning the first embodiment and the second embodiment.

In the example of FIG. 10B, the UE transmits multiplexed control information and data using resources in an extended PSCCH resource pool, and transmits data using resources in an extended PSSCH resource pool. However, this is one example. The respective resource pools may be resource pools of types (for example, PSDCH resource pools) different from the PSCCH/PSSCH resource pools.

First Embodiment

Next, the first embodiment will be described. According to the first embodiment, the UE multiplexes control information and data in resources of a single resource pool, and transmits the multiplexed control information and data using the resources. As detailed operation examples of the first embodiment, there are Example 1-1 and Example 1-2. According to Example 1-1, the UE multiplexes, in a single message of a variable size, control information and data. According to Example 1-2, the UE transmits a single message in a manner of dividing the message into a plurality of sub-messages (parts). Below, Example 1-1 and Example 1-2 will be described in detail. Note that, it is assumed that a message A and a message B that will now be described are messages which a UE-A and a UE-B transmits, respectively.

Example 1-1

As described above, according to Example 1-1, in a message of a variable size, control information and data are multiplexed. Note that, "variable" means that, when the UE transmits a message, it is possible to change the size of the message for each resource pool that comes periodically. "Fixed" that will be described later means that, when the UE transmits a message, the size of the message does not change for each resource pool that comes periodically.

Figure 11A:
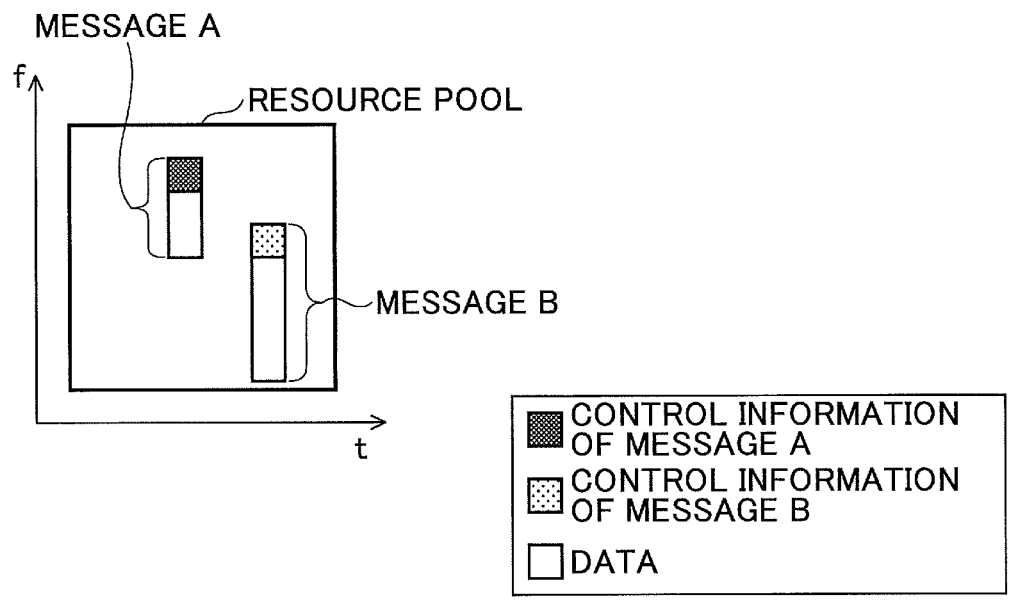
FIG. 11A illustrates a transmission method according to Example 1-1.

FIG. 11A shows a transmission method example No. 1 according to Example 1-1. As shown in FIG. 11A, according to the transmission method example No. 1, the UE transmits a single message using a single cluster. This example assumes a case where a single carrier (for example, SC-FDMA) is used for transmission, and, for the purpose of securing the characteristics of a single carrier, a message is not divided in frequency direction. That is, as shown in FIG. 11A, for each of the message A and message B, control information and data are mapped in different frequency domains. However, each frequency domain is contiguous in frequency direction. Also, the width of the message in time direction is, for example, 1 subframe. However, the width of the message in time direction is not limited thereto.

Figure 11B:
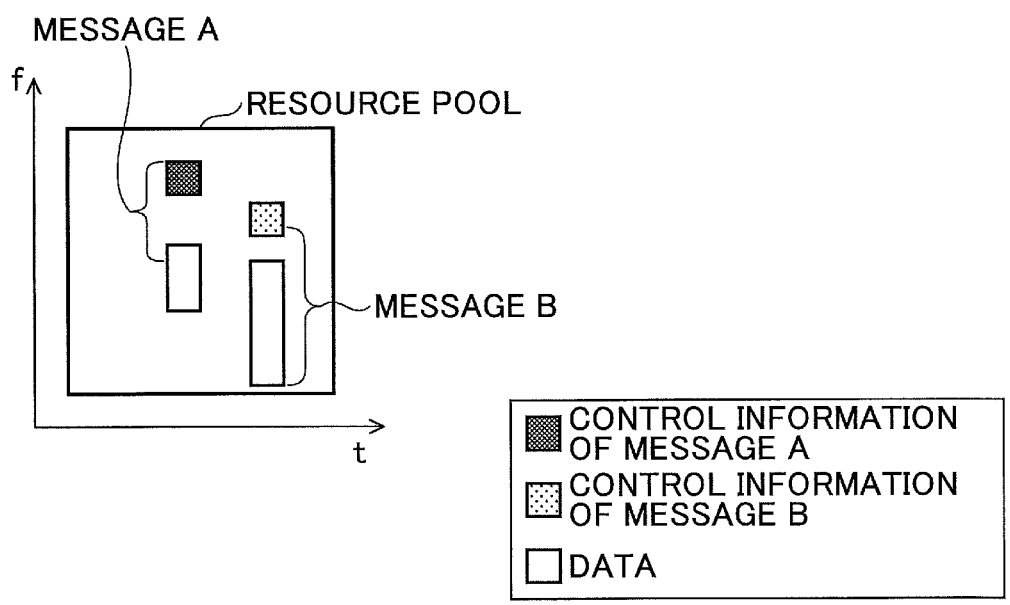
FIG. 11B illustrates a transmission method according to Example 1-1.

FIG. 11B shows a transmission method example No. 2 according to Example 1-1. As shown in FIG. 11B, according to the transmission method example No. 2, the UE transmits a single message using a plurality of clusters. That is, as shown in FIG. 11B, for each of the message A and the message B, control information and data are mapped in different frequency domains, and the frequency domains are separate in frequency direction.

Figure 11C:
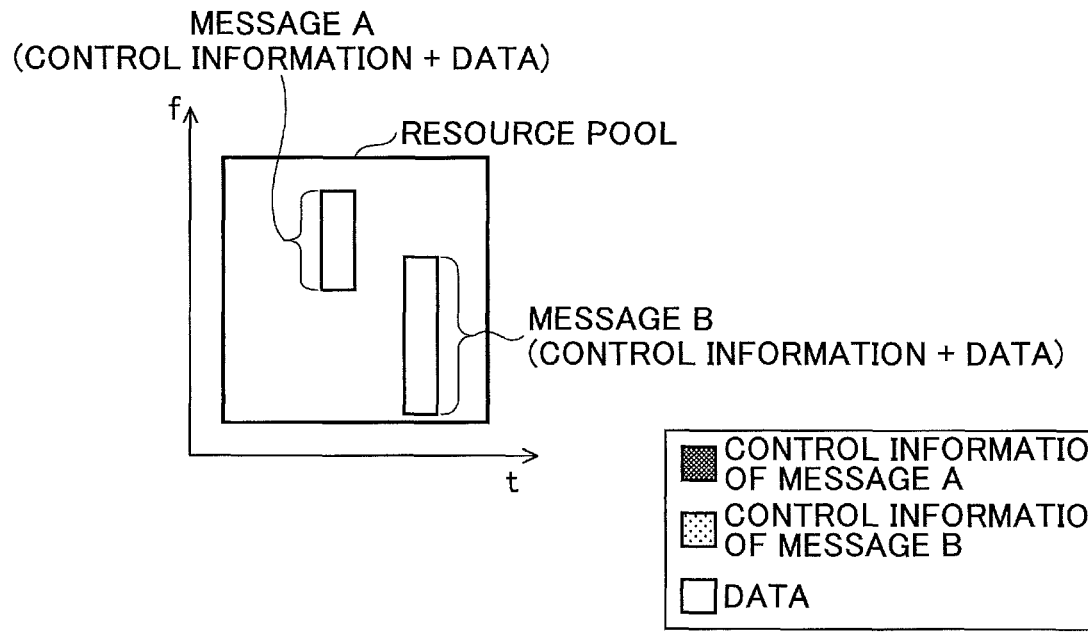
FIG. 11C illustrates a transmission method according to Example 1-1.

FIG. 11C shows a transmission method example No. 3 according to Example 1-1. As shown in FIG. 11C, according to the transmission method example No. 3, in the same way as the transmission method example No. 1, the UE transmits a single message using a single cluster. However, according to the transmission method example No. 3, the resources of the control information are allocated to symbols near a DMRS (demodulation reference signal), and the other resources are allocated for the data. For example, a multiplexing method similar to a multiplexing method used when UCI (uplink control information: ACK/NACK, or the like) is transmitted where the UCI is multiplexed to PUSCH is used.

In each of the above-mentioned examples (in the same way also in the other embodiments), control information may be called SCI or SA, and includes, for example, an MCS, the number and/or positions of the PRBs of data, an ID, and so forth. Concerning control information, for example, the UE selects resources to transmit from a resource pool in a random manner. Alternatively, high quality resources may be selected instead of random manner selection. Concerning data, data may be transmitted using resources designated by control information.

Figure 12A:
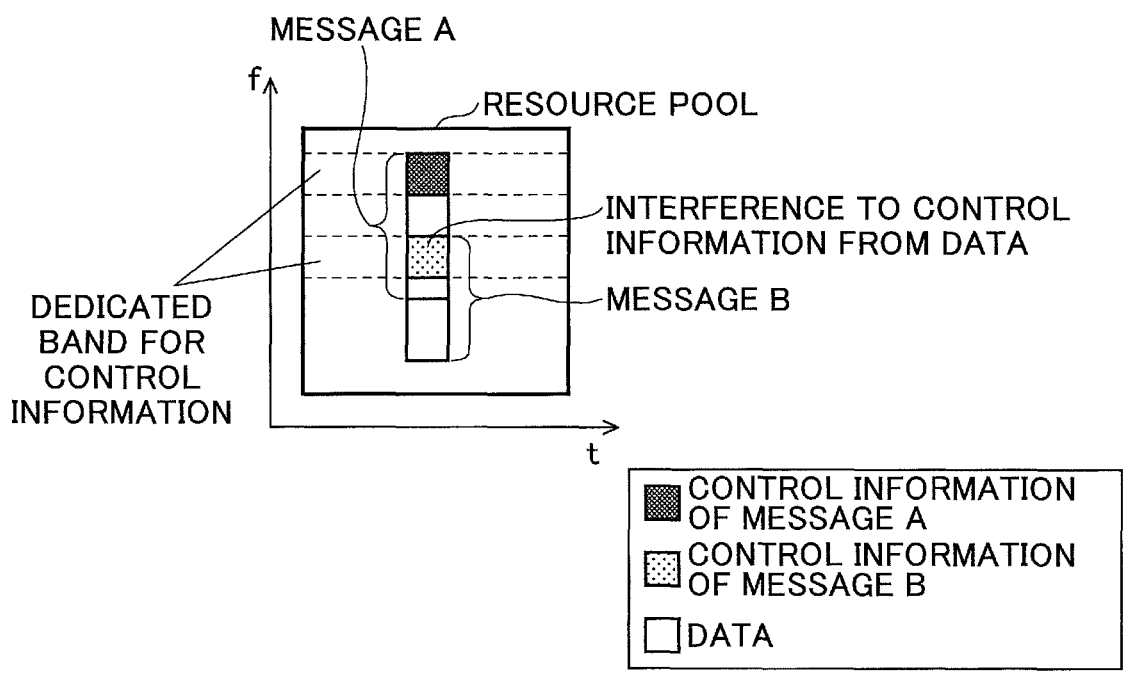
FIG. 12A illustrates another example of a transmission method according to Example 1-1.
Figure 12B:
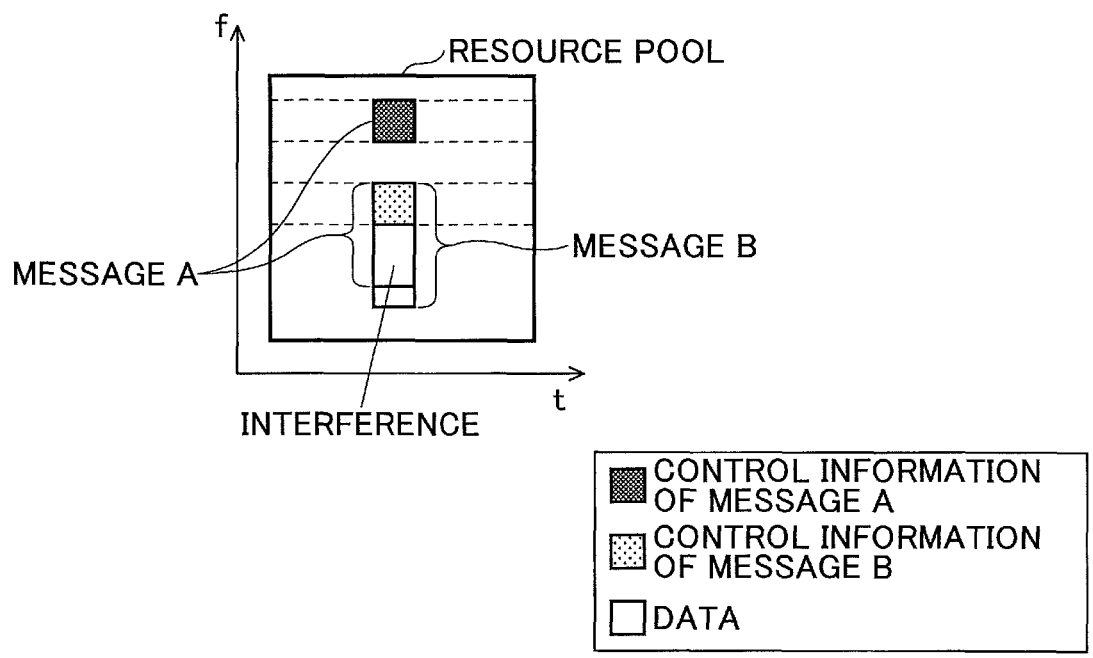
FIG. 12B illustrates another example of a transmission method according to Example 1-1.

However, in the above-mentioned method, the reception-side UE needs to search all the resource positions in a blind manner for detecting a message having a variable size, and a delay may occur. Therefore, for example, as shown in FIGS. 12A and 12B, a band dedicated to control information is allocated, and the UE transmits control information using PRBs in the band.

In this case, the reception-side UE needs to search only the predetermined bands for detecting the control information, and therefore, it is possible to reduce a delay. However, in this case, the control information of a certain message may be interfered with by the data of another message. In each of the examples of FIGS. 12A and 12B, the control information of the message B is interfered with by the data of the message A. Although such interference may occur, this method is one of methods advantageous to solve the conventional problem, in that overhead is reduced by multiplexing control information and data, and a delay is reduced. In particular, this method is advantageous when traffic is not high.

Example 1-2

Next, Example 1-2 will be described. As described above, according to Example 1-2, the UE transmits a single message in a manner of dividing the message into a plurality of sub-messages (i.e., parts, or partial messages, and, hereinafter, will be referred to as "parts"). The number (N) of parts is variable, where N≥2. The size of each part is fixed or variable. Note that, a size concerning the embodiments (including the first and second embodiments) means the number of bits, or the number of PRBs.

The plurality of parts included in the message may be transmitted using resources in the same resource pool, or may be transmitted using resources included in a plurality of resource pools. Example 1-2 will be described using an example where a message is transmitted using resources in the same resource pool, whereas an example where a message is transmitted using resources included in a plurality of resource pools will be described concerning the second embodiment (Examples 2-1 and 2-2).

The UE can determine whether to transmit the plurality of parts using a single resource pool or using a plurality of resource pools according to, for example, configuration made by the eNB.

Control information is mapped in one or more parts from among the plurality of parts acquired from dividing the single message, and data is mapped in the other parts. It is also possible that, in a single part, control information and data are multiplexed. The UE may explicitly transmit information indicating which parts of the plurality of parts correspond to the control information to the reception-side UE, or may implicitly indicate which parts of the plurality of parts correspond to the control information to the reception-side UE. For example, it is pre-determined in the system that a part having an index of 1 includes control information, and it can be reported whether the part in which a DMRS that will be described later is inserted includes control information, by reporting the index using information (for example: a cyclic shift) of the DMRS.

Control information includes, for example, an MCS, ID, the number of sub-messages (parts), the number/positions of PRBs of data, and so forth. Note that an MCS in control information is an MCS of the control information, an MCS of the data, or both. This point is also applied to the other Examples and the other embodiments.

Figure 13:
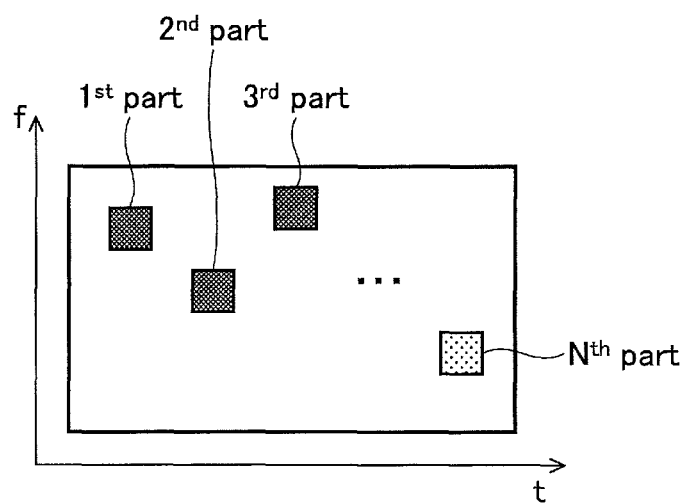
FIG. 13 illustrates a transmission method according to Example 1-2.

FIG. 13 shows a transmission method example No. 1 according to Example 1-2. As shown in FIG. 13, according to the transmission method example No. 1, a single message is divided into N parts. In the example of FIG. 13, the message is divided (multiplexed) in time direction and in frequency direction. However, the message may be divided in time direction within the same frequency domain (for example, within the frequency width of 1 PRB), or the message may be divided in frequency direction within the same time domain (for example, within the time width of 1 subframe).

In the example shown in FIG. 13, the first ($1^{st}$) through (N−1)th (($N-1)^{th}$) parts have the same fixed sizes. The Nth ($N^{th}$) part has a variable size. Note that, this is one example, and the number of fixed-size parts and the number of variable-size parts may be freely determined. The size (the number of bits or the number of PRBs) of the Nth part may be the same as or different from the size of another part. Concerning a MCS, all the parts may use the same MCSs, or the 1st through (N−1)th parts may use the same MCSs while the Nth part may use a different MCS, for example.

In order to associate the plurality of parts included in a single message together, the UE includes, for example, a temporary ID (common to the parts) in each part. The ID is the least significant 8 bits of the MAC address, for example. Alternatively, in order to associate the plurality of parts included in a single message together, the UE may use a sequence, a cyclic shift, or the like of a DMRS, or may use a hopping rule or a transmission resource position index.

The UE may transmit the control information and data in a manner of multiplexing the control information and data in the fixed-size parts (the 1st through (N−1)th parts). As a multiplexing method, the multiplexing methods shown in FIGS. 11A-11C concerning Example 1-1 may be used. That is, any one of the method of multiplexing the control information and data using a plurality of PRBs and/or a plurality of subframes as a single cluster (FIG. 11A), the method of multiplexing the control information and data as a plurality of clusters (FIG. 11B), and the method of multiplexing the control information and data using the same PRB and/or subframe as a single cluster (FIG. 11C).

It is also possible that, when the plurality of parts are transmitted as shown in FIG. 13, the UE selects resources for transmitting parts that include the control information from the pool (for example, in a random manner), and determines resources for transmitting the other parts using a hopping rule (a T-F hopping rule) prescribed in 3GPP, release 12 or 13, for example.

As shown in FIG. 13, by transmitting the single message in the manner of dividing the message into the plurality of parts, it is possible to implement the variable-size message.

In comparison to a conventional method of transmitting only control information using a specific resource pool, it is possible to reduce overhead, and implement appropriate multiplexing of control information and data.

The reception-side UE which receives the plurality of parts detects the parts that includes the control information through blind search, for example, and receives the data based on information indicated by the control information, the hopping rule, or the like.

By using the method of transmitting a message in a manner of dividing the message, it is possible to flexibly determine the size of the message that includes control information and data. As a result, it is possible to easily multiplex the control information and data. Consequently, in comparison to a method of transmitting only control information using a dedicated resource pool, it is possible to reduce overhead concerning transmission of control information, and it is possible to appropriately transmit and receive data.

Example of Controlling Using DMRS

In Example 1-2, it is possible to report the control information concerning dividing using a DMRS multiplexed to each sub-message (part). Note that the contents of the DMRS itself are basically the same as the contents of the DMRS in the D2D communication shown in FIG. 7A, 7B, and so forth.

For example, the base sequence of the DMRS is associated with the number of dividing, and the UE reports the number of parts (divisions) using the base sequence used in the DMRS. In this example, a single base sequence may indicate a single size, and all the parts may have the same sizes. In this case, the number of parts corresponds to the size of the message.

It is also possible that the cyclic shift of the DMRS to be multiplexed to a part is associated with the index of the part, and the UE reports the index of each part using the cyclic shift.

The reception-side UE which receives the DMRS can identify the received DMRS by, for example, searching a predetermined plurality of candidate DMRSs.

Figure 14:
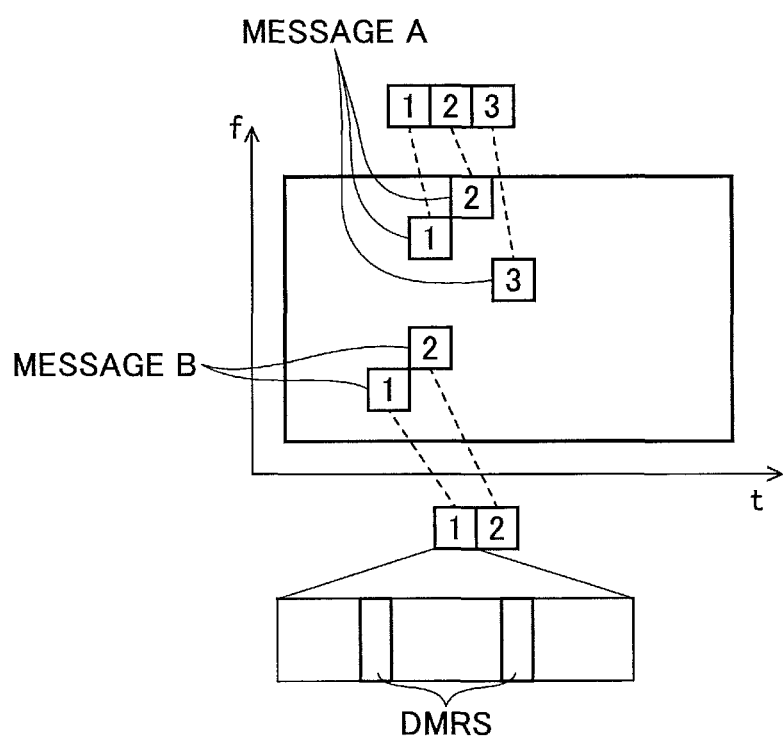
FIG. 14 illustrates an example where control using a DMRS is carried out in Example 1-2.

FIG. 14 shows a transmission method example No. 2 according to Example 1-2. The transmission method example No. 2 is one example of a case of reporting control information concerning dividing using a DMRS mentioned above. In the example of FIG. 14, the UE-A divides the message A into three, and thus, transmits a part 1, a part 2, and a part 3. Note that "1" of the "part 1", for example, is the index of the part. The UE-B divides the message B into two, and thus, transmits a part 1 and a part 2.

As shown in FIG. 14, in the part 1 of the message B, two DMRSs are multiplexed in the time length of one subframe of the part 1, for example. DMRSs are also multiplexed in the other parts of the message B, and also, in the respective parts of the message A in the same way.

Concerning each of the messages A and B, the UE may use predetermined resources for transmitting each part, or the UE may determine the corresponding resources using, as described above, a hopping rule (a T-F hopping rule) prescribed in 3GPP, release 12 or 13. In the example shown in FIG. 14, the plurality of parts belonging to the same message are transmitted using contiguous subframes, and hopping is used only for the frequency domain.

FIGS. 15A and 15B show relationships between configurations of the messages according to the transmission method example No. 2 of Example 1-2 (FIG. 14) and configuration information of DMRSs. The information indicating such relationships may be previously set in the UE, or may be set in the UE by the eNB. In the example of FIG. 15A, the DMRS having the base sequence X is multiplexed (inserted) in each part of the message A, and the base sequence X corresponds to the fact that the message includes the three parts. That is, the base sequence X corresponds to the fact that the message size is "3 parts" (on the premise that each part has the same size). Also the value of the cyclic shift of the DMRS corresponds to the index of the part. For example, in the example of the message A of FIG. 15A, the DMRS having the cyclic shift=0 corresponds to the part 1, the DMRS having the cyclic shift=1 corresponds to the part 2, and the DMRS having the cyclic shift=2 corresponds to the part 3.

In the above-mentioned example, the base sequence of the DMRS corresponds to the message size. However, it is also possible that, instead, an OCC (orthogonal cover code) corresponds to the message size. In this case, the same base sequences are used. The value of the cyclic shift of the DMRS corresponds to the index of the part.

FIG. 15B shows relationship between configurations of the messages and configuration information of DMRSs in this case. In the example of FIG. 15B, the OCC set {1,−1} corresponds to the fact that the message includes the 3 parts. That is, the OCC set {1,−1} corresponds to the fact that the message size is the 3 parts. The OCC set {1,1} corresponds to the fact that the message includes the 2 parts. Concerning the cyclic shifts, the same method as FIG. 15A is used.

Figure 16A:
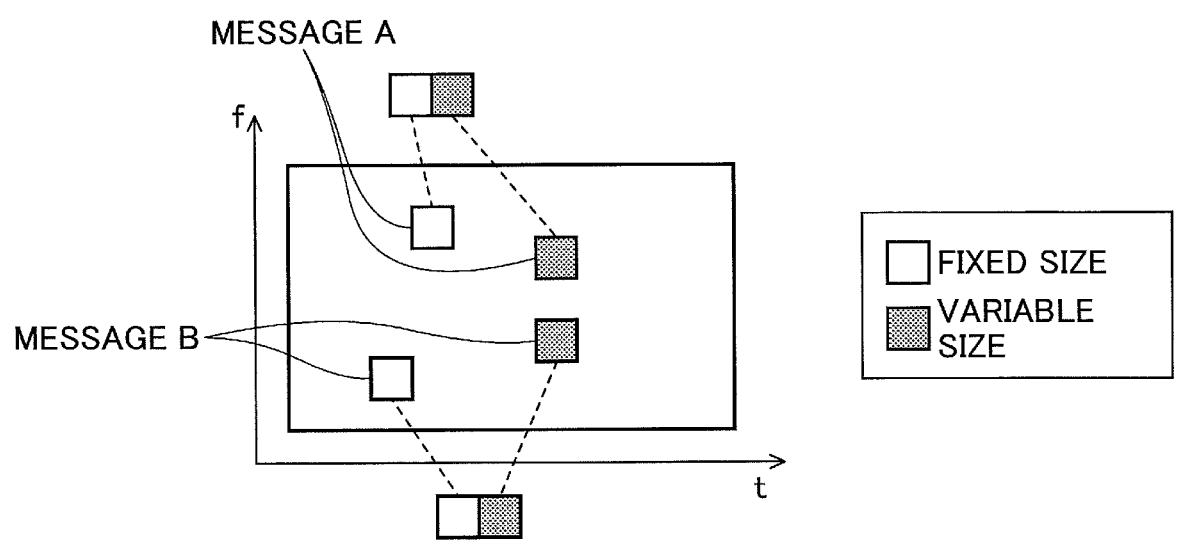
FIG. 16A illustrates another example where control using a DMRS is carried out in Example 1-2.

FIG. 16A shows a transmission method example No. 3 according to Example 1-2. As shown in FIG. 16A, according to the transmission method example No. 3, a single message includes fixed-size parts and variable-size parts. Then, the base sequence of DMRS multiplexed to each part indicates the fixed size (the size of the fixed-size part), and the cyclic shift indicates the variable size. In this example, the "fixed size" corresponds to the numbers of PRBs that are common between the fixed-size parts and the variable-size parts.

The example shown in FIG. 16B corresponding to FIG. 16A is an example where the fixed-size parts and the variable-size parts have the same numbers of PRBs, and have different MCSs. Actually, in FIG. 16B, the base sequence X represents the fixed size N. For the fixed-size parts, the cyclic shift 0 is used common among the respective messages. The value 0 represents MCS-a. For the variable-size parts, the base sequence X is also used. The X represents the same number of PRBs as the fixed-size parts. On the other hand, concerning the cyclic shifts of the DRMSs in the variable-size parts, different values may be used for the respective messages. According to this example, 1 (representing MCS-b) is used for the variable-size parts of the message A, and 2 (representing MCS-c) is used for the variable-size parts of the message B. Thus, it is possible to allocate different numbers of bits for the respective messages concerning the variable-size parts.

Second Embodiment

Next, the second embodiment will be described. According to the second embodiment, time-frequency resources are partitioned into a plurality of resource pools through time division multiplexing and/or frequency division multiplexing.

The number of partitioning (the number of types of the resource pools) is not particularly limited. According to the second embodiment, resources are partitioned into two, i.e., a type-1 pool and a type-2 pool.

The type-1 pool is a resource pool for the UE to transmit a fixed-size message (that may be a partial message). In the fixed-size message, control information and data are multiplexed. Note that, multiplexing control information and data in the type-1 pool is not necessary, and the UE may transmit only control information or may transmit only data in the type-1 pool.

The type-2 pool is a resource pool for supporting a variable-size partial message mainly for transmitting data.

In control information (that may be called SCI or SA) transmitted using type-1 pool resources, for example, the resource size/position, a MCS, resource reservation information, ID, an additional data indicator (more data indicator), and so forth, of a variable-size part transmitted using the type-2 pool, are included. Also, in the control information, a MCS and the resource size/position of data transmitted using the type-1 pool may be included.

The above-mentioned additional data indicator is, for example, an indicator of 1 bit, and indicates whether resources are allocated to the type-2 pool (whether data is transmitted using the type-2 pool). For example, if the indicator has a value 0, this means that there are no resources allocated to the type-2 pool. In this case, resources for control information can be reused as resources for data.

If the indicator has a value 1, this means that there are resources allocated to the type-2 pool. In this case, resources for control information cannot be reused as resources for data. Note that, it is also possible that, also in this case, resources for control information are made to be able to be reused as resources for data.

As a method of multiplexing control information and data in the type-1 resource, the multiplexing methods in Example 1-1 shown in FIGS. 11A-11C may be used. That is, any one of the method of allocating the control information and data to a plurality of contiguous PRBs and/or subframes, and multiplexing the control information and data as a single cluster (FIG. 11A); the method of allocating the control information and data in a non-contiguous manner, and multiplexing the control information and data as a plurality of clusters (FIG. 11B); and the method of allocating the control information and data contiguously and multiplexing the control information and data as a single cluster using the same PRB and/or subframe (FIG. 11C) can be used.

Control information such as the MCS, the size, and so forth concerning data transmitted using the type-2 pool resource may be transmitted in a manner of, for example, being added to the packet header of the packet that transports the data.

It is also possible to add a CRC to each of control information and data. Thereby, it is possible to detect an error. Concerning MCSs, it is also possible to use different MCSs for control information and data.

As examples of multiplexing the type-1 pool and the type-2 pool according to the second embodiment, Example 2-1 using time division multiplexing (TDM) and Example 2-2 using frequency division multiplexing (FDM) will now be described.

Example 2-1

Figure 17A:
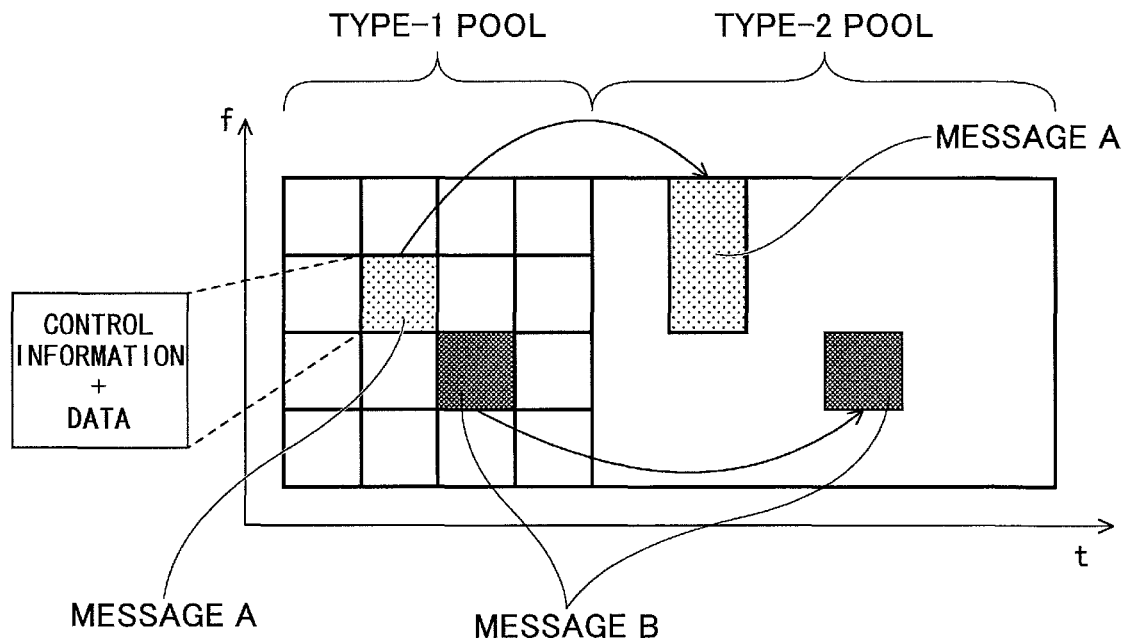
FIG. 17A illustrates a transmission method according to Example 2-1.
Figure 17B:
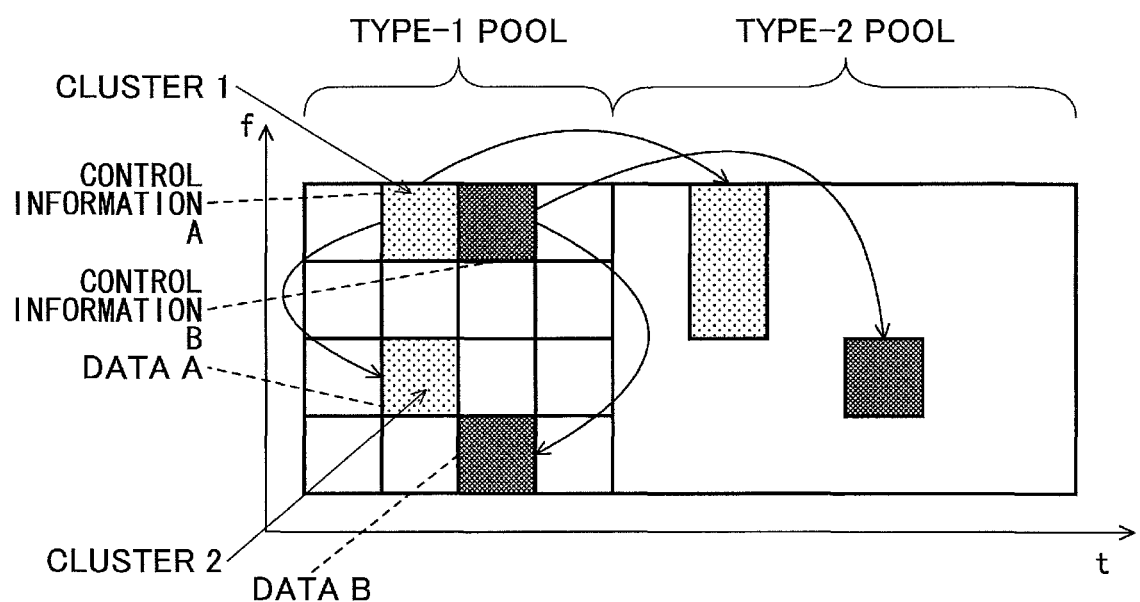
FIG. 17B illustrates a transmission method according to Example 2-1.

FIGS. 17A and 17B illustrate transmission methods according to Example 2-1. As shown in FIGS. 17A and 17B, the type-1 pool and the type-2 pool are multiplexed in a time division manner.

In the example shown in FIGS. 17A and 17B, a UE-A transmits a message A, and a UE-B transmits a message B.

Each message includes fixed-size parts using resources in the type-1 pool, and variable-size parts using type-2 resources. In the example shown in FIG. 17A, for each message, the fixed-size part in the type-1 pool is transmitted as the single cluster. In the example shown in FIG. 17B, for each message, the fixed-size parts in the type-1 pool are transmitted as the plurality of clusters. Note that, in the type-1 pool, the size of a message is not necessarily fixed, and may be variable.

In each of the cases of FIGS. 17A and 17B, in the fixed-size parts, control information and data are multiplexed. For example, in the fixed-size part (1 cluster) of the message A in FIG. 17A, control information and data are multiplex in the 1 cluster.

Also, for example, in the fixed-size parts (including the cluster 1 and the cluster 2) of the message A in FIG. 17B, the cluster 1 is used to transmit control information, and the cluster 2 is used to transmit data.

Example 2-2

Figure 18:
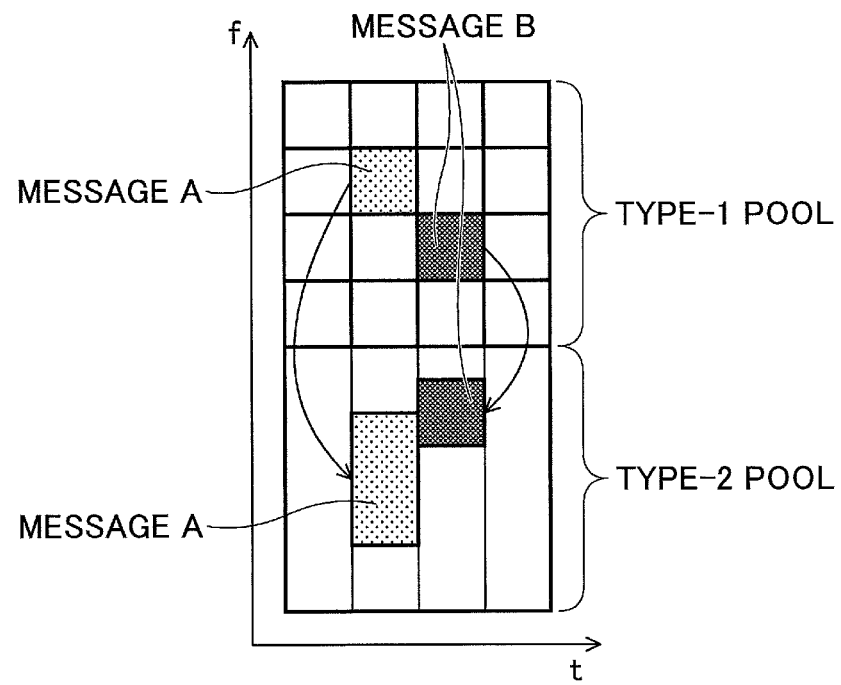
FIG. 18 illustrates a transmission method according to Example 2-2.

FIG. 18 illustrates a transmission method according to Example 2-2. As shown in FIG. 18, the type-1 pool and the type-2 pool are multiplexed in a frequency division manner. The type-1 pool and the type-2 pool are configured with, for example, multiple carriers in OFDMA or the like, or a plurality of bands of the same carrier. According to Example 2-2, fixed-size parts using resources of the type-1 pool and variable-size parts using resources of the type-2 pool are transmitted in the same subframe. Note that, although FIG. 18 shows a configuration where the fixed-size part includes the 1 cluster, the fixed-size part may include a plurality of clusters.

Below, matters common to Examples 2-1 and 2-2 will be described in more detail.

<Type-1 Pool and Type-2 Pool>

The type-1 pool includes a plurality of fixed-size resource blocks. The resource blocks are assumed as RBs prescribed in LTE. However, the resource blocks are not limited thereto, and blocks having other sizes may be used instead.

The type-1 pool is suitable for, for example, transmitting a part (sub-message) having a small size such as a digest of a certificate, or the like. Configuration of the size (unit) of a resource that the UE uses in the type-1 pool is made by, for example, signaling from the eNB (signaling common between the transmission-side UE and the reception-side UE). It is also possible that the transmission-side UE determines the size (unit), and reports it to the reception-side UE by including information indicating which size is used in a DMRS (for example, a base sequence, a cyclic shift, an OCC, or the like).

The transmission-side UE may freely determine the position and the size of a resource used in the type-2 pool for transmitting data; or several types of resource positions/sizes may be pre-determined in the system, and the UE may select therefrom. The type-2 pool is suitable for, for example, transmitting a sub-message having a large size such as the entirety of a certificate, or the like.

Example 1 of Resource Size Configuration in Type-1 Pool

FIGS. 19A-19D shows examples 1 of configuration of the unit of the resource size in the type-1 pool. In these examples, configuration is assumed to be made through signaling using system information from the eNB, or the like.

Figure 19A:
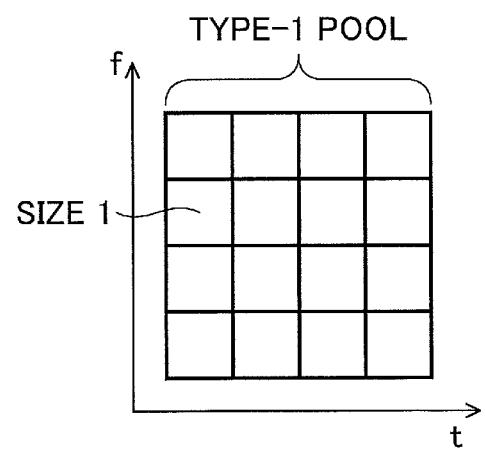
FIG. 19A shows one example of a resource size configuration in a type-1 pool.
Figure 19B:
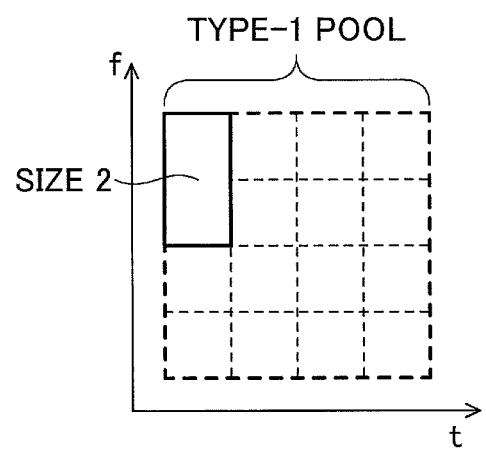
FIG. 19B shows one example of a resource size configuration in a type-1 pool.
Figure 19C:
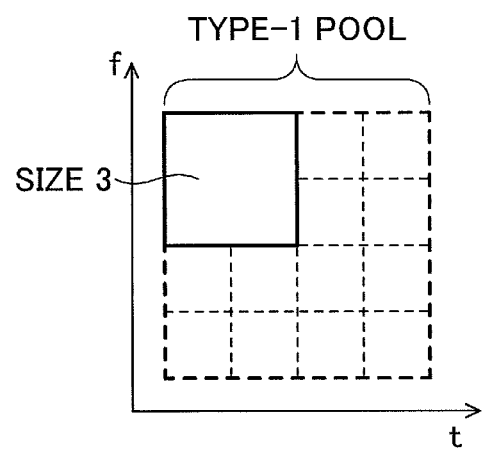
FIG. 19C shows one example of a resource size configuration in a type-1 pool.
Figure 19D:
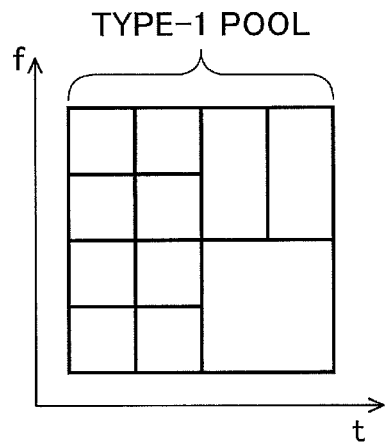
FIG. 19D shows one example of a resource size configuration in a type-1 pool.

FIG. 19A shows an example where configuration of "size 1 resource" is made in the UE. In this case, the UE can select particular resource blocks. The UE selects one or more from among the plurality of blocks (squares) shown in FIG. 19A, and uses the selected one or more blocks to transmit fixed-size parts. FIG. 19B shows configuration of "size 2 resource". In this case, the UE can select 2 resource blocks each time. FIG. 19C shows configuration of "size 3 resource". In this case, the UE can select 4 resource blocks each time. Also, FIG. 19D shows configuration using combination patterns of different resource sizes (multiplexing according to TDM and/or FDM). In this case, the UE can select the resources in units of squares shown.

Example 2 of Resource Size Configuration in Type-1 Pool

Figure 20A:
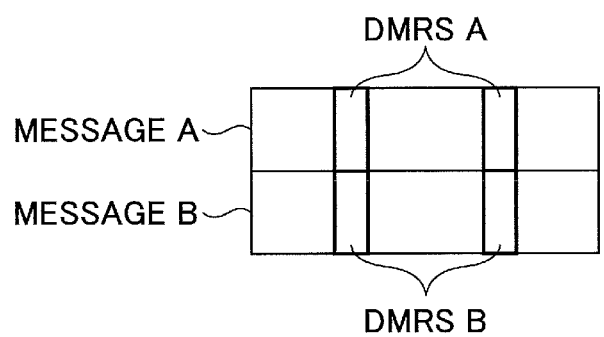
FIG. 20A shows one example of a resource size configuration in a type-1 pool.
Figure 20B:
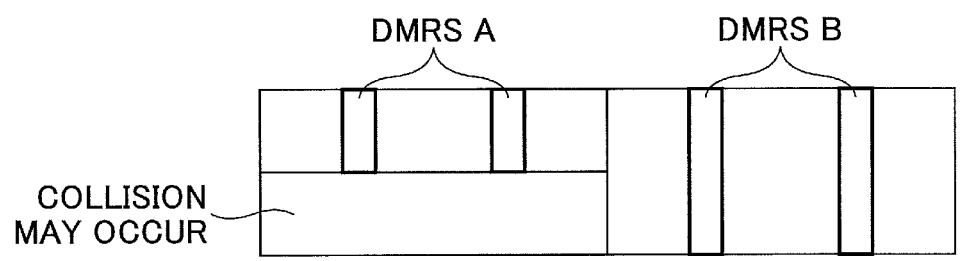
FIG. 20B shows one example of a resource size configuration in a type-1 pool.

FIGS. 20A and 20B show Example 2 of resource size configuration in the type-1 pool.

FIG. 20A shows an example where, to each message, a fixed number of PRBs are allocated. That is, in this case, respective messages that the UEs transmit include the same numbers of PRBs. However, the MCSs may be different thereamong. That is, in the example shown in FIG. 20A, the messages A and B have the same numbers of PRBs. However, DMRS-A and DMRS-B have, for example, different base sequences (for example, corresponding to the MCSs). It is also possible that DMRS-A and DMRS-B have the same base sequences and different OCC sets. It is also possible that DMRS-A and DMRS-B have the same base sequences and different cyclic shifts.

FIG. 20B shows an example where, to each message, a plurality of fixed-size resource blocks are allocated. The numbers of resource blocks may be different among messages of a plurality of the UEs. However, the MCSs are the same among the messages. Note that, it is also possible that the MCSs are different among the messages.

DMRS-A and DMRS-B have, for example, different base sequences (for example, corresponding to the numbers of fixed-size resource blocks). It is also possible that DMRS-A and DMRS-B have the same base sequences and different OCC sets. It is also possible that DMRS-A and DMRS-B have the same base sequences and different cyclic shifts.

Note that, in the example of FIG. 20B, there is a likelihood that the messages having the different sizes overlap and a collision occurs therebetween.

Examples of Multiplexing Control Information and Data

As described above, in the type-1 pool, it is possible to multiplex control information and data in a part of 1 cluster acquired from dividing a message. Below, an example of multiplexing where control information and data are multiplexed without being separated into different PRBs or subframes (for example, FIG. 11C) will be described. Note that, the description that will now be made can be applied to the first and the second embodiments in common. In each of FIGS. 21A-21D and FIGS. 22A-22D that will be now described, a square frame represents "1 cluster" described above, the horizontal axis represents the time direction, and the vertical axis represents the frequency direction.

Figure 21A:
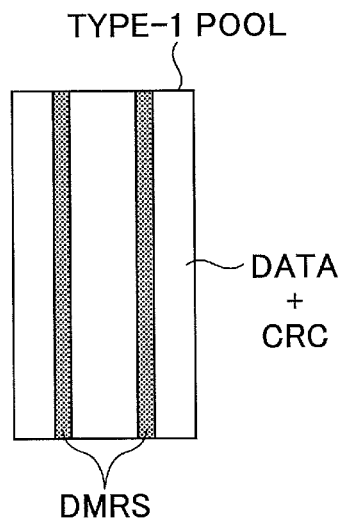
FIG. 21A shows one example of a control information and data multiplexing method.
Figure 21B:
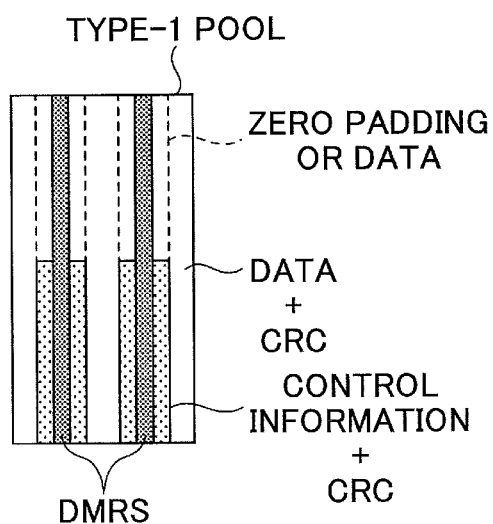
FIG. 21B shows one example of a control information and data multiplexing method.
Figure 21C:
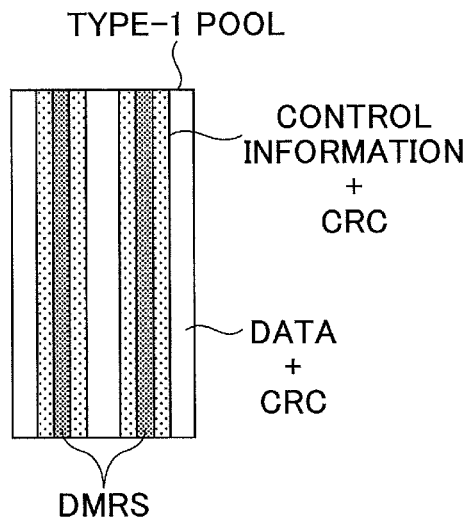
FIG. 21C shows one example of a control information and data multiplexing method.
Figure 21D:
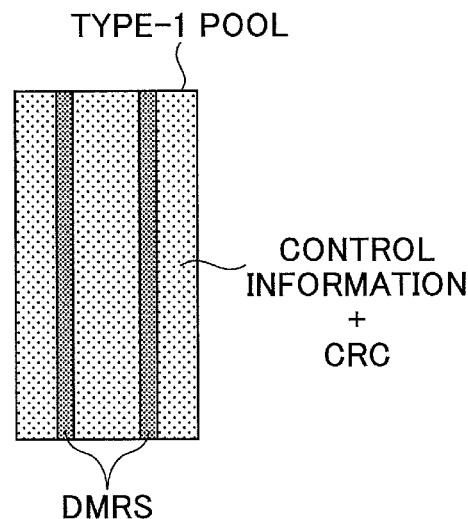
FIG. 21D shows one example of a control information and data multiplexing method.
Figure 22A:
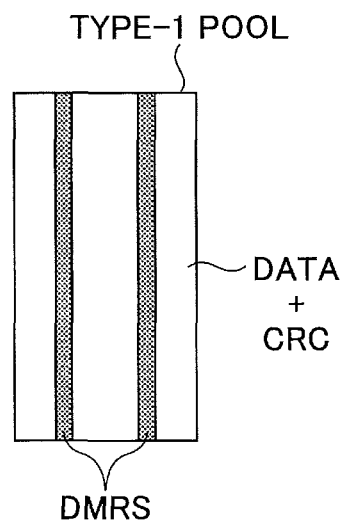
FIG. 22A shows one example of a control information and data multiplexing method.

FIGS. 21B and 21C show examples where, when control information and data are multiplexed, the control information is placed adjacent to a DMRS in time direction. In this example, the control information is allocated to a symbol adjacent to a symbol that transmits the DMRS. For comparison, FIG. 21A shows an example for a case where no control information is multiplexed, and FIG. 22D shows an example for a case where no data is multiplexed. The methods shown FIGS. 21B and 21C have advantageous effects that preciseness in channel estimation is high.

Figure 22B:
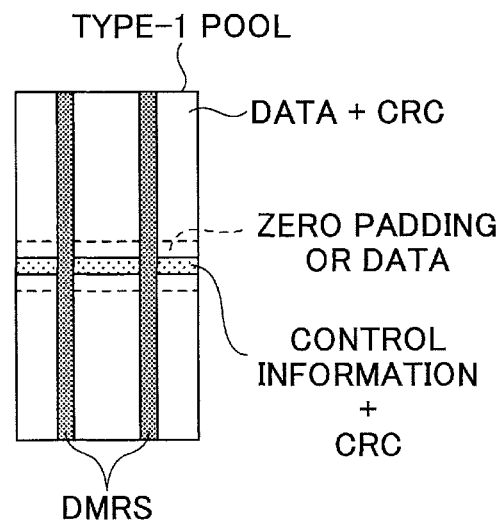
FIG. 22B shows one example of a control information and data multiplexing method.
Figure 22C:
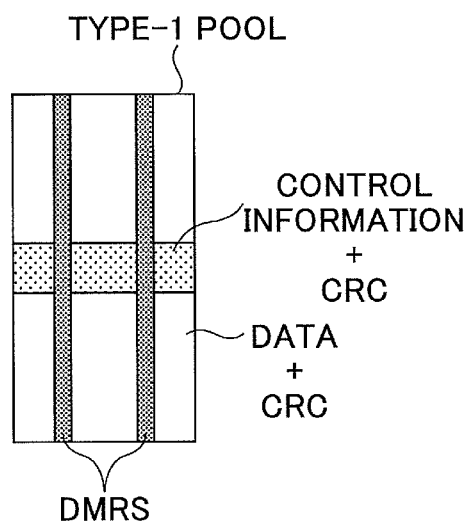
FIG. 22C shows one example of a control information and data multiplexing method.
Figure 22D:
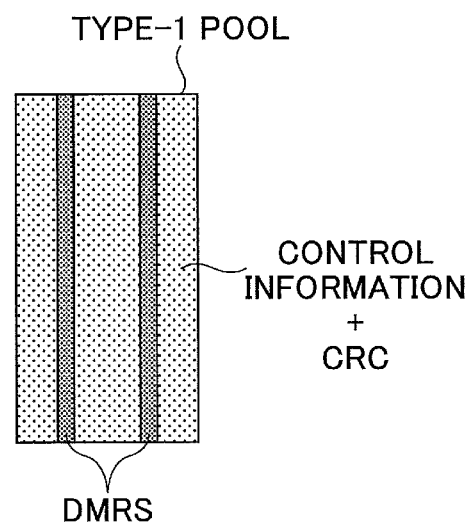
FIG. 22D shows one example of a control information and data multiplexing method.

FIGS. 22B and 22C shows cases where, when control information and data are multiplexed, the control information is placed in a cluster, in a predetermined bandwidth at a middle part in frequency direction, throughout (except for DMRSs) in time direction. For comparison, FIG. 22A shows an example where control information is not multiplexed, and FIG. 22D shows an example where data is not multiplexed. The methods shown in FIGS. 22B and 22C are advantageous in that interference from an adjacent resource is not likely to occur.

The transmission-side UE may send information indicating which of the methods of FIGS. 21A-21D and FIGS. 22A-22D is used to the reception side, using a DMRS (a cyclic shift, an OCC, a base sequence, or the like), using an explicit signaling bit, or using a CRC masking.

Thus, the first and second embodiments have been described. Examples in the first embodiment may be implemented in a manner of being combined together. Also, Examples in the second embodiment may be implemented in a manner of being combined together. Also, Examples in the first embodiment and Examples in the second embodiment may be implemented in a manner of being combined together.

(Apparatus Configuration)

Figure 23:
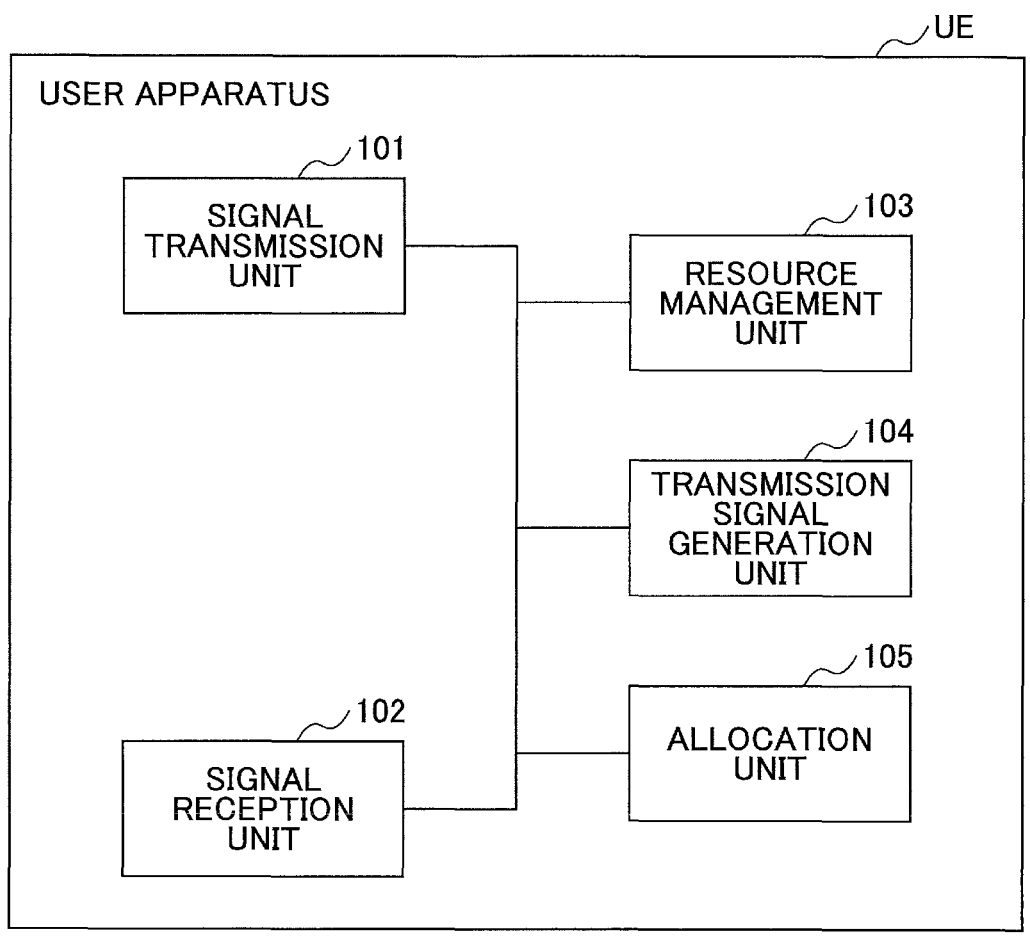
FIG. 23 is a configuration diagram of a user apparatus UE.

FIG. 23 shows a functional configuration of the UE according to the embodiment. The UE shown in FIG. 23 can carry out the entirety of the processing of the UE described above. However, it is also possible that the UE can partially carry out the processing of the UE described above (for example, only one or more Examples, or the like).

As shown in FIG. 23, the UE includes a signal transmission unit 101, a signal reception unit 102, a resource management unit 103, a transmission signal generation unit 104, and an allocation unit 105. Note that, FIG. 23 shows only functional units in particular concerning the embodiments of the present invention in the UE, and also includes functions, not shown, for carrying out at least operations according to LTE. The functional configuration shown in FIG. 23 is merely one example. As long as the operations of the UE according to the embodiments can be carried out, the function classifications and the name of the functions may be any other ones. Also, when the UE is applied to V2X, the UE can become any apparatus included in V2X. For example, the UE may be a terminal that a vehicle, an RSU, or a pedestrian holds, or the like.

The signal transmission unit 101 maps signals (for example, bits, or symbols converted from bits) generated by the transmission signal generation unit 104 to resources, thus generates a radio signal, and transmits the radio signal wirelessly. The signal transmission unit 101 has a D2D (including V2X) transmission function and a cellular communication transmission function. Note that, the transmission method concerning D2D may be any one of SC-FDMA, OFDM, and OFDMA. It is also possible to use another transmission method.

The signal reception unit 102 has functions of wirelessly receiving various signals from another UE, an eNB, and so forth, and acquiring signals of upper layers from the received signals of a physical layer. The signal reception unit 102 has a D2D (including V2X) reception function and a cellular communication reception function.

The resource management unit 103 holds information of resource pools to be used for carrying out data transmission and reception in the UE, and so forth, based on, for example, configuration made by the eNB or a RSU. The information of resource pools is used by the allocation unit 105, the signal transmission unit 101, the signal reception unit 102, and so forth, for signal transmission and reception.

The transmission signal generation unit 104 generates various signals of lower layers from signals of upper layers to be transmitted from the UE, and sends the generated signals to the signal transmission unit 101. Note that, it is possible that the signal transmission unit 101 includes the transmission signal generation unit 104. Signals generated by the transmission signal generation unit 104 include DMRSs. When control information concerning dividing will be sent using DMRSs, the transmission signal generation unit 104 determines base sequences, cyclic shifts, OCCs, or the like, of the DMRSs to be inserted in partial messages, as shown in FIGS. 15A, 15B, FIGS. 16A, 16B, or the like, and generates the DMRSs using the base sequences, the cyclic shifts, the OCCs, or the like.

The allocation unit 105 allocates resources to messages as illustrated concerning the first and second embodiments. Information concerning resource allocation is sent to the signal transmission unit 101 together with corresponding transmission signals, and the signal transmission unit 101 uses the information to map the signals to the resources. Processing of dividing a message into a plurality of parts may be carried out by the transmission signal generation unit 104 or the resource allocation unit 105. Insertion (multiplexing) of demodulation reference signals into partial messages may be carried out by the transmission signal generation unit 104 or the resource allocation unit 105.

The entirety of the configuration of the UE shown in FIG. 23 may be implemented by hardware circuits (for example, one or more IC chips), or parts thereof may be implemented by hardware circuits and the other parts may be implemented by a CPU and programs.

Figure 24:
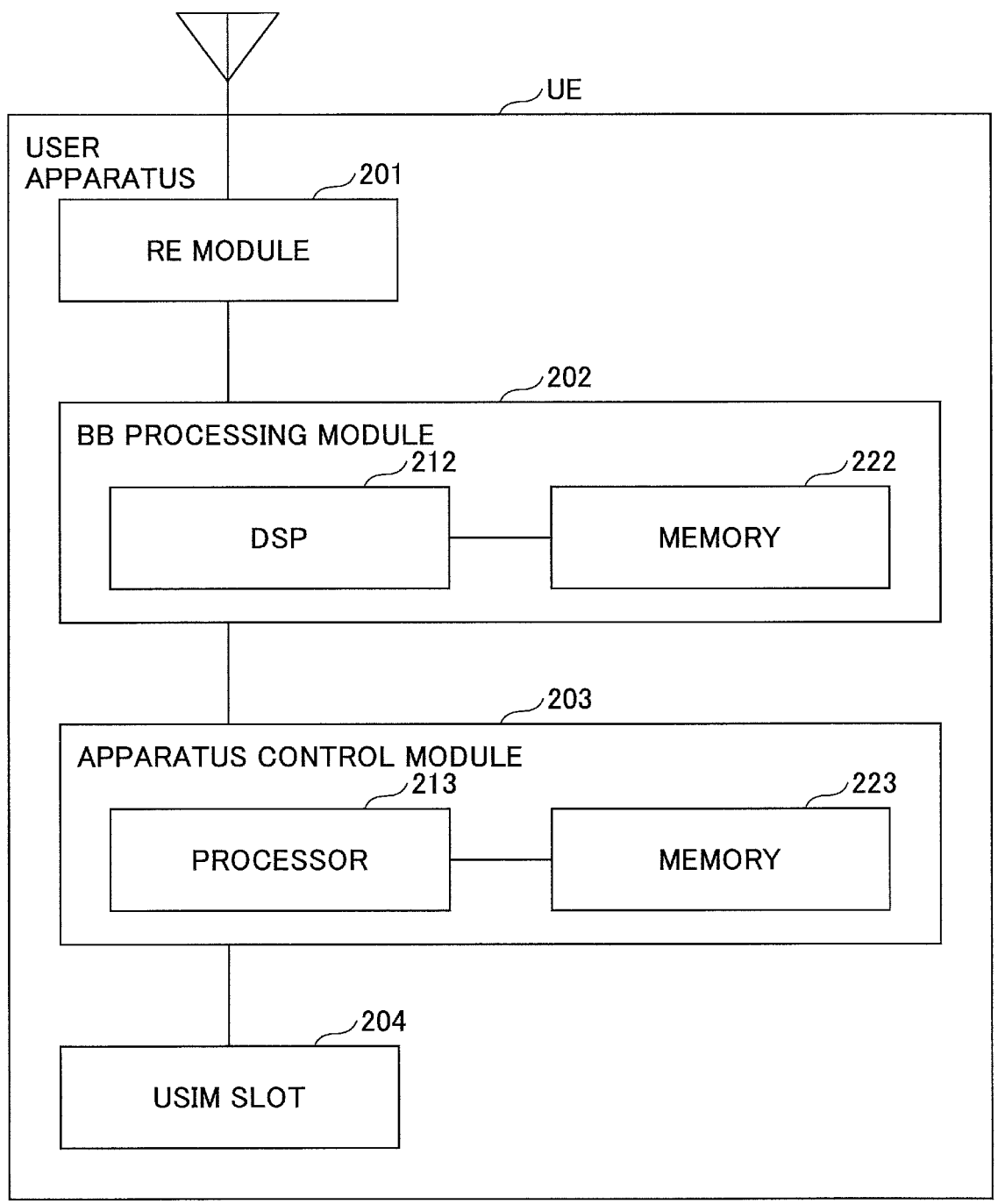
FIG. 24 is a HW diagram of a user apparatus UE.

FIG. 24 shows one example of a hardware (HW) configuration of the UE. FIG. 24 has a configuration nearer to an implementation example than FIG. 23. As shown in FIG. 24, the UE includes a RE (Radio Equipment) module 201 carrying out processing concerning radio signals, a BB (Baseband) processing module 202 carrying out baseband signal processing, an apparatus control module 203 carrying out processing of upper layers, and so forth, and a USIM slot 204 as an interface to access a USIM card.

The RE module 201 carries out D/A (Digital-to-Analog) conversion, modulation, frequency conversion, power amplification, and so forth, on a digital baseband signal received from the BB processing module 202, to generate a radio signal to be transmitted from an antenna. Also, the RE module 201 carries out frequency conversion, A/D (Analog to Digital) conversion, modulation, and so forth on a received radio signal to generate a digital baseband signal, and sends the digital baseband signal to the BB processing module 202. The RE module 201 includes, for example, the signal transmission unit 101 and a part of the signal reception unit 102 of FIG. 23.

The BB processing module 202 carries out processing of converting an IP packet and the digital baseband signal therebetween. A DSP (Digital Signal Processor) 212 carries out signal processing in the BB processing module 102. A memory 222 is used as a work area of the DSP 201. The BB processing module 202 includes, for example, a part of the signal reception unit 102, the transmission signal generation unit 104, and the allocation unit 105 of FIG. 23.

The apparatus control module 203 carries out IP layer protocol processing, processing of various applications, and so forth. A processor 213 carries out processing carried out by the apparatus control module 203. A memory 223 is used as a work area of the processor 213. The processor 213 reads data from and writes data to an USIM through the USIM slot 204. The apparatus control module 203 includes, for example, the resource management unit 103 of FIG. 23.

Summary of Embodiments

As described above, according to the embodiments, a user apparatus in a mobile communication system is provided. The user apparatus includes an allocation means that divides a message that includes control information and data into a plurality of partial messages, and allocates resources included in one or more resource pools to the plurality of partial messages; and a transmission means that transmits the plurality of partial messages using the resources allocated by the allocation means.

According to the above-mentioned configuration, it is possible to flexibly determine the size of a message that includes control information and data. Thus, it is possible to easily multiplex control information and data. Consequently, in comparison to a method of transmitting only control information using a dedicated resource pool, it is possible to reduce overhead concerning transmission of control information, and appropriately transmit and receive data.

It is possible that the allocation means multiplexes a demodulation reference signal in each partial message, and uses a base sequence corresponding to a size of the message as a base sequence of the demodulation reference signal. According to this configuration, it is possible to implicitly report the size of a message, and reduce overhead of control information.

It is possible that the allocation means multiplexes a demodulation reference signal in each partial message, and uses the OCC corresponding to a size of the message as an OCC used in the demodulation reference signal. According to this configuration, it is possible to implicitly report the size of a message, and reduce overhead of control information.

It is also possible that the allocation means uses, as a cyclic shift used in the demodulation reference signal, a cyclic shift corresponding to an index of the partial message to which the demodulation reference signal is multiplexed. According to this configuration, it is possible to implicitly report the size of a message, and reduce overhead of control information.

It is also possible that the plurality of partial messages include a fixed-size partial message and a variable-size partial message. By thus using a fixed size, it is possible to reduce overhead concerning control.

It is also possible that the allocation means multiplexes the control information and the data at least in a single partial message of the plurality of partial messages. By thus multiplexing the control information and the data in a single partial message, it is not necessary to transmit a message that includes only control information, and it is possible to reduce overhead.

It is also possible that the allocation means allocates resources of a first resource pool to the partial message in which the control information and the data are multiplexed, and allocates resources of a second resource pool to a partial message that includes the data. By thus transmitting data using another resource pool, it is possible to improve flexibility of the message size, the transmission rate, and so forth.

It is also possible that the allocation means allocates resources, adjacent in a time domain to resources allocated to the demodulation reference signal, to the control information, from among the resources allocated to the partial message in which the control information and the data is multiplexed. Thereby, it is possible to improve the channel estimation preciseness.

It is also possible that the allocation means allocates resources, having a predetermined bandwidth at a center part relative to a frequency direction, to the control information, from among the resources allocated to the partial message in which the control information and the data is multiplexed. Thereby, it is possible to reduce interference with the control information from other data and control information.

"Means" in the above-mentioned configurations of the apparatuses may be replaced with "unit", "circuit", "device", or the like.

The configuration of the UE described above concerning the embodiments may be implemented as a result of, in the UE including a CPU (processor) and a memory, the CPU executing a program; may be implemented by hardware such as hardware circuits including processing logics described above concerning the embodiments; or may be implemented by a mixture of a program and hardware.

The configuration of the eNB described above concerning the embodiments may be implemented as a result of, in the eNB including a CPU (processor) and a memory, the CPU executing a program; may be implemented by hardware such as hardware circuits including processing logics described above concerning the embodiments; or may be implemented by a mixture of a program and hardware.

The embodiments of the present invention have been described. However, the disclosed invention is not limited to these embodiments, and the person skilled in the art will understand various variants, modifications, alternatives, replacements, and so forth. Although the description has been made using the specific numeral values, these numerical values are merely examples and any other suitable values may be used unless otherwise specified. The classifications of items in the above description are not essential to the present invention, two or more classified items may be used after being combined together as appropriate, or a matter described in one item may be applied to a matter described in another item (unless causing contradiction). The boundaries of the functional units or the processing units in the functional block diagrams do not necessarily correspond to the physical boundaries of components. A plurality of the functional units may be implemented by a physically single component, or operation of a single functional unit may be carried out by physically plurality of components. Although the user apparatus UE has been described using the functional block diagrams for the sake of convenience in describing the processing, such an apparatus may be implemented by hardware, software, or a mixture thereof. Software running in a processor that the UE according to the embodiments of the present invention has may be stored in any suitable recording medium such as a random access memory (RAM), a flash memory, a read-only memory (ROM), an EPROM, an EEPROM, a register, a hard disk (HDD), a removable disk, a CD-ROM, a database, a server, or the like.

Supplement to Embodiments

Reporting information is not limited to the examples described above, and may be implemented using another method. For example, reporting information may be implemented using physical layer signaling (for example, DCI (Downlink Control Information) or UCI (Uplink Control Information)), upper layer signaling (for example, RRC signaling, MAC signaling, broadcast information (MIB (Master Information Block), or SIB (System Information Block))), another signal, or a combination thereof. An RRC message may be called RRC signaling. An RRC message may be, for example, an RRC Connection Setup message, an RRC Connection Reconfiguration message, or the like.

Each embodiment described above may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or another system using a suitable system and/or a next-generation system extended based thereon.

The information that is input and output or the like may be stored in a specific place (for example, a memory), or managed using a management table. The information that is input and output or the like may be overwritten, updated, or appended. The information that is output or the like may be deleted. The information that is input or the like may be transmitted to another apparatus.

The determination may be made using a value (0 or 1) indicated by a bit, or using a truth value (Boolean: true or false), or using comparison of numerical values (for example, comparison with a given value).

The information, the signals, and so forth, described above, may be expressed using various different technologies. For example, data, instructions, commands, information, signals, bits, symbols, tips, and so forth, mentioned in the entirety of the above description may be expressed using voltages, currents, electromagnetic waves, magnetic fields or magnetic particles, optical fields or photons, or any combinations thereof.

Note that, the terms described above and/or the terms necessary to understand the above description may be replaced with the terms having the same or similar meanings. For example, the channels and/or symbols may be signals. Also, the signals may be messages.

The UE may be called by the person skilled in the art a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or one of other appropriate terms.

In the processing procedures, the sequences, and so forth, described above, the orders may be changed unless causing contradiction. For example, the methods described above show various elements of steps in the illustrative orders, and are not limited to the specific orders shown.

The embodiments described above may be used solely, may be combined, or may be switched when being carried out. Also, reporting predetermined information (for example, reporting that "X occurs") is not limited to be explicitly carried out, and may be implicitly carried out (for example, by not reporting predetermined information).

The term "to determine" used in the specification may mean various operations. For example, "to determine" may mean to consider having determined to have performed calculating, computing, processing, deriving, investigating, looking up (for example, looking up using a table, a database, or another data structure), ascertaining, or the like.

Also, "to determine" may mean to consider having determined to have performed receiving (for example, receiving information), transmitting (for example, transmitting information), inputting, outputting, accessing (for example, accessing data in a memory), or the like. Also, "to determine" may mean to consider having determined to have performed resolving, selecting, choosing, establishing, comparing, or the like. That is, "to determine" may mean to consider having determined a certain operation.

Words "based on" used in the specification do not mean "only based on" unless otherwise specified. That is, the words "based on" mean both "only based on" and "at least based on".

The present invention is not limited to the above-mentioned embodiments, and, without departing from the spirit of the present invention, various variants, modifications, alternatives, replacements, and so forth, are included in the present invention.

DESCRIPTION OF REFERENCE SIGNS

UE user apparatus
eNB base station
101 signal transmission unit
102 signal reception unit
103 resource management unit
104 transmission signal generation unit
105 allocation unit
201 RE module
202 BB processing module
203 apparatus control module
204 USIM slot

The invention claimed is:

1. A terminal comprising:
a processor configured to generate sidelink control information divided into two parts which are first sidelink control information and second sidelink control information; and
a transmitter configured to transmit the first sidelink control information, the second sidelink control information, and data by sidelink communication,
wherein the processor is configured to multiplex a demodulation reference signal (DM-RS) with the second sidelink control information and the data in a frequency division multiplexing manner,
wherein the transmitter is configured to transmit the second sidelink control information and the data by multiplexing them in a same single resource pool, and
wherein the first sidelink control information includes a same Modulation and Coding Scheme (MCS) for the second sidelink control information and the data that are transmitted and multiplexed in the same single resource pool.

2. The terminal as claimed in claim 1, wherein the second sidelink control information includes an identity (ID) of 8 bits.

3. A transmission method performed by a terminal, comprising:
generating sidelink control information divided into two parts which are first sidelink control information and second sidelink control information;
transmitting the first sidelink control information, the second sidelink control information, and data by sidelink communication; and
multiplexing a demodulation reference signal (DM-RS) with the second sidelink control information and the data in a frequency division multiplexing manner, wherein the second sidelink control information and the data are transmitted by multiplexing them in a same single resource pool, and wherein the first sidelink control information includes a same Modulation and Coding Scheme (MCS) for the second sidelink control information and the data that are transmitted and multiplexed in the same single resource pool.

\* \* \* \* \*